(12) United States Patent
Chu

(10) Patent No.: US 11,863,664 B2
(45) Date of Patent: Jan. 2, 2024

(54) METHOD OF PERFORMING KEY EXCHANGE FOR SECURITY OPERATION IN STORAGE DEVICE AND METHOD OF PERFORMING AUTHORITY TRANSFER IN STORAGE DEVICE USING THE SAME

(71) Applicant: SAMSUNG ELECTRONICS CO., LTD., Suwon-si (KR)

(72) Inventor: Younsung Chu, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 396 days.

(21) Appl. No.: 17/326,718

(22) Filed: May 21, 2021

(65) Prior Publication Data
US 2022/0123921 A1    Apr. 21, 2022

(30) Foreign Application Priority Data
Oct. 20, 2020    (KR) ........................ 10-2020-0135849

(51) Int. Cl.
H04L 29/06    (2006.01)
H04L 9/08     (2006.01)
H04L 9/32     (2006.01)

(52) U.S. Cl.
CPC ............ *H04L 9/083* (2013.01); *H04L 9/0822* (2013.01); *H04L 9/0825* (2013.01);
(Continued)

(58) Field of Classification Search
CPC ..... H04L 9/083; H04L 9/0822; H04L 9/0825; H04L 9/0869; H04L 9/3247;
(Continued)

(56) References Cited

U.S. PATENT DOCUMENTS 8,688,973 B2    4/2014   Kerschbaum et al.
8,806,214 B2    8/2014   Sudhakar
(Continued)

FOREIGN PATENT DOCUMENTS

CN    111988288 A  *  11/2020  ............. H04L 63/06
JP     3921159 B2  *   5/2007  ............. H04L 63/08
JP    2022048601 A  *   3/2022  ......... H04L 67/1097

OTHER PUBLICATIONS

European Search Report dated Jan. 24, 2022 in corresponding European Patent Application No. 21185276.9 (10 pages).

*Primary Examiner* — Sher A Khan
(74) *Attorney, Agent, or Firm* — F. CHAU & ASSOCIATES, LLC

(57) ABSTRACT

A method for performing key exchange for a security operation in a storage device includes generating, by a trusted third party (TTP), a first certificate based on a first user ID and first public key and generating a second certificate based on a second user ID and second public key. While the storage device is accessed by the first user ID, a first verification is performed on the second certificate based on a third certificate. When the first verification is successfully completed, a ciphering key is derived based on a first private key and the second public key. While the storage device is accessed by the second user ID, a second verification is performed on the first certificate based on the third certificate. When the second verification is successfully completed, the ciphering key is derived based on a second private key and the first public key.

20 Claims, 20 Drawing Sheets

(52) U.S. Cl.
CPC .......... *H04L 9/0869* (2013.01); *H04L 9/3247*
(2013.01); *H04L 9/3263* (2013.01)

(58) Field of Classification Search
CPC ............. H04L 9/3263; H04L 2463/062; H04L
63/0435; H04L 63/062; H04L 63/0823;
H04L 9/0816; H04L 9/0819; H04L
9/0838; G06F 21/78
See application file for complete search history.

(56) References Cited

U.S. PATENT DOCUMENTS

| | | | |
|---|---|---|---|
| 9,331,989 B2 | 5/2016 | Dover | |
| 9,705,859 B2 | 7/2017 | Campagna | |
| 9,754,118 B2 | 9/2017 | Näslund et al. | |
| 9,990,162 B2* | 6/2018 | Kim | G06F 3/0679 |
| 10,412,063 B1* | 9/2019 | Mandich | H04L 63/061 |
| 10,841,784 B2* | 11/2020 | Wang | H04W 12/04 |
| 11,444,931 B1* | 9/2022 | Quevedo | H04L 41/50 |
| 2009/0025076 A1* | 1/2009 | Rowley | G06Q 10/06 |
| | | | 726/10 |
| 2012/0204032 A1* | 8/2012 | Wilkins | H04L 9/321 |
| | | | 713/170 |
| 2013/0173931 A1 | 7/2013 | Tzafrir | |
| 2014/0032933 A1 | 1/2014 | Ramesh | |
| 2016/0119291 A1* | 4/2016 | Zollinger | H04L 63/061 |
| | | | 713/171 |
| 2018/0076954 A1* | 3/2018 | Mesiano | G06Q 20/3829 |
| 2019/0333304 A1* | 10/2019 | Flynn | H04W 4/70 |
| 2020/0153808 A1 | 5/2020 | Oxford et al. | |
| 2020/0348867 A1* | 11/2020 | Chanler | G06F 3/0611 |
| 2021/0157747 A1* | 5/2021 | Shin | G06F 21/32 |

* cited by examiner

METHOD OF PERFORMING KEY EXCHANGE FOR SECURITY OPERATION IN STORAGE DEVICE AND METHOD OF PERFORMING AUTHORITY TRANSFER IN STORAGE DEVICE USING THE SAME

CROSS-REFERENCE TO RELATED APPLICATION

This application claims priority under 35 USC § 119 to Korean Patent Application No. 10-2020-0135849 filed on Oct. 20, 2020 in the Korean Intellectual Property Office (KIPO), the contents of which are herein incorporated by reference in their entirety.

BACKGROUND

1. Technical Field

One or more embodiments described herein relate to security measures for semiconductor devices.

2. Description of the Related Art

Solid state drives (SSDs) and other types of semiconductor memories outperform hard disk drives (HDDs) by achieving faster data access speeds. They also exhibit improved stability and durability and lower power consumption in many cases. Recently, hardware-based full-disk encryption (FDE) has been used to improve security performance of HDDs and SSDs, and for this reason may sometimes be referred to as self-encrypting drives (SEDs). SED drives may operate based on the OPAL storage specification (or simply OPAL) developed by the Trusted Computing Group (TCG). The OPAL specification is intended to enhance security for self-encrypting drives.

SUMMARY

One or more embodiments described herein provide a method of improving security of a storage device, which, for example, may be a semiconductor memory.

One or more embodiments described herein may provide a method of improving security by performing a key exchange for a security operation in a storage device such as a self-encrypting drive (SED).

One or more embodiments described herein provide a method of performing authority transfer in a storage device (e.g., SED) using the key exchange method.

In accordance with one or more embodiments, a method of performing key exchange for a security operation in a storage device to be accessed by a plurality of user identifications (IDs) includes generating, by a trusted third party (TTP) in or coupled to the storage device, a first certificate based on a first user ID and a first public key and generating, by the TTP, a second certificate based on a second user ID and a second public key. The method further includes, while the storage device is accessed by the first user ID, performing a first verification on the second certificate based on a third certificate in or accessed by the TTP, and when the first verification is successfully completed, deriving a ciphering key based on a first private key and the second public key obtained by the first verification. The method further includes, while the storage device is accessed by the second user ID, performing a second verification on the first certificate based on the third certificate and, when the second verification is successfully completed, deriving the ciphering key based on a second private key and the first public key obtained by the second verification.

In accordance with one or more embodiments, a method is provided for performing authority transfer in a storage device that includes a first storage region and is accessed by a plurality of user identifications (IDs). The method includes performing a key exchange between a first user ID having a first access authority to the first storage region and a second user ID to be obtained the first access authority and, while the storage device is accessed by the first user ID, encrypting a first key-encryption-key (KEK) based on a ciphering key, the first KEK corresponding to the first access authority, the ciphering key being obtained by the key exchange. The method further includes, while the storage device is accessed by the second user ID, decrypting the encrypted first KEK based on the ciphering key.

In addition, performing the key exchange includes generating, by a trusted third party (TTP) in or coupled to the storage device, a first certificate for the first user ID based on the first user ID and a first public key, generating, by the TTP, a second certificate for the second user ID based on the second user ID and a second public key and, while the storage device is accessed by the first user ID, performing a first verification on the second certificate based on a third certificate in or accessed by the TTP. The method further includes, when the first verification is successfully completed, deriving the ciphering key based on a first private key and the second public key obtained by the first verification and, while the storage device is accessed by the second user ID, performing a second verification on the first certificate based on the third certificate. The method further includes, when the second verification is successfully completed, deriving the ciphering key based on a second private key and the first public key obtained by the second verification.

In accordance with one or more embodiments, a method is provided for performing key exchange for security operation in a storage device that is accessed by a first user identification (ID) and a second user ID, the first user ID having a first private key and a first public key, the second user ID having a second private key and a second public key, the key exchange being performed between the first user ID and the second user ID.

The method includes generating, by a trusted third party (TTP) in or coupled to the storage device and having a third private key and a third public key, a first certificate by signing the first user ID and the first public key based on the third private key. The method also includes generating, by the TTP, a second certificate by signing the second user ID and the second public key based on the third private key, storing the first certificate, the second certificate and a third certificate for the TTP in a key slot in which the first private key, the first public key, the second private key and the second public key are stored, and accessing the storage device based on the first user ID and a first password.

The method further includes, while the storage device is accessed by the first user ID, performing a first verification on the second certificate by extracting the third public key based on the third certificate, by verifying a signature for the second certificate based on the third public key, and by extracting the second user ID and the second public key in the second certificate when a verification on the signature for the second certificate is successfully completed. The method further includes deriving a ciphering key by obtaining a first key-protection-key (KPK) based on the first password and a random value, by obtaining the first private key based on the first KPK, and by performing a key agreement based on the first private key and the second public key, and accessing the storage device based on the second user ID and a second password.

The method further includes, while the storage device is accessed by the second user ID, performing a second verification on the first certificate by extracting the third public key based on the third certificate, by verifying a signature for the first certificate based on the third public key, and by extracting the first user ID and the first public key in the first certificate when a verification on the signature for the first certificate is successfully completed. The method further includes deriving the ciphering key by obtaining a second KPK based on the second password and the random value, by obtaining the second private key based on the second KPK, and by performing the key agreement based on the second private key and the first public key.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
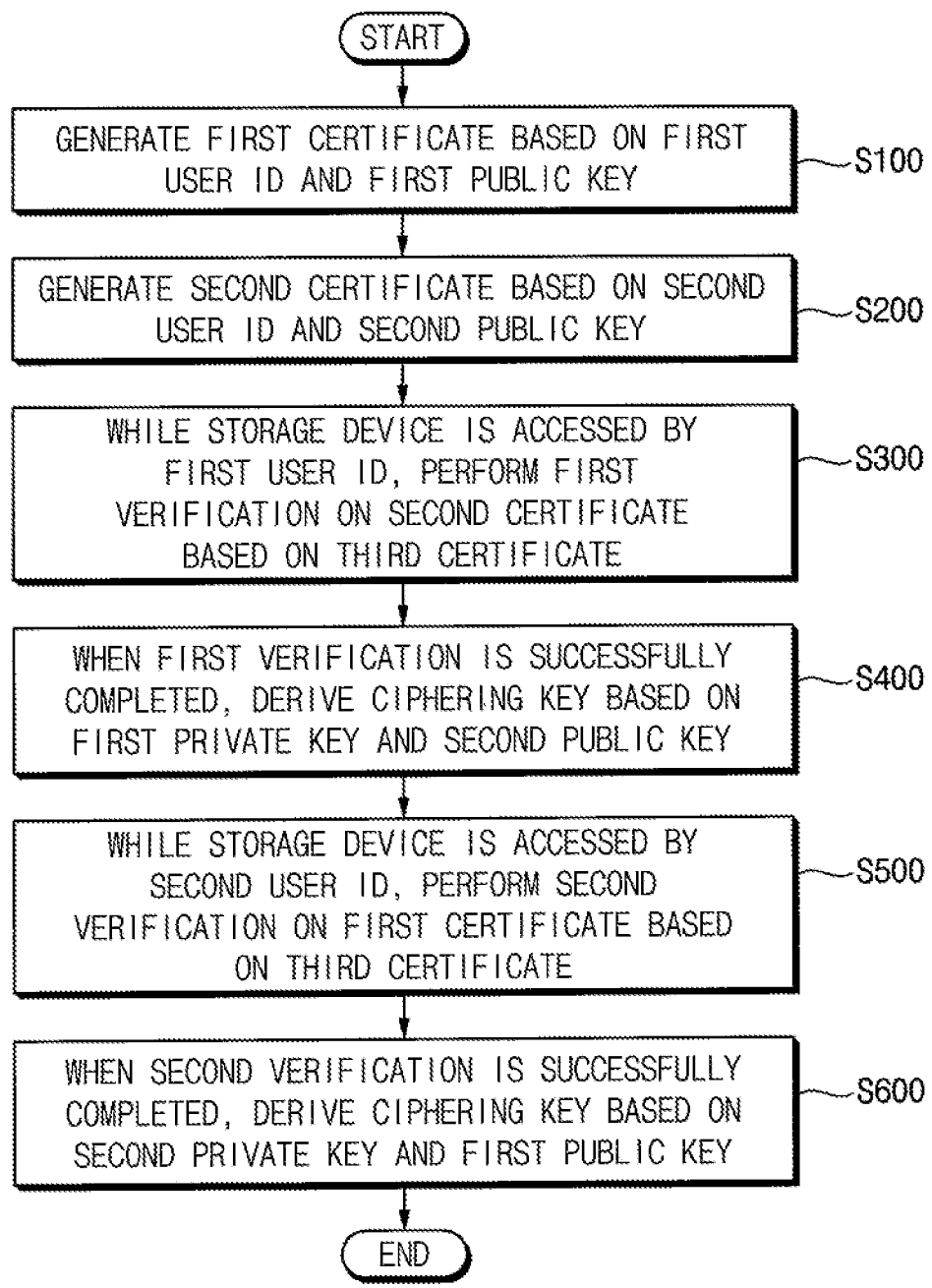
FIG. 1 illustrates an embodiment of a method of performing a key exchange for a security operation in a storage device.

Various example embodiments are described with reference to the accompanying drawings, in which embodiments are shown. The present disclosure may, however, be embodied in many different forms and should not be construed as limited to the embodiments set forth herein. Like reference numerals refer to like elements throughout this application.

Figure 2:
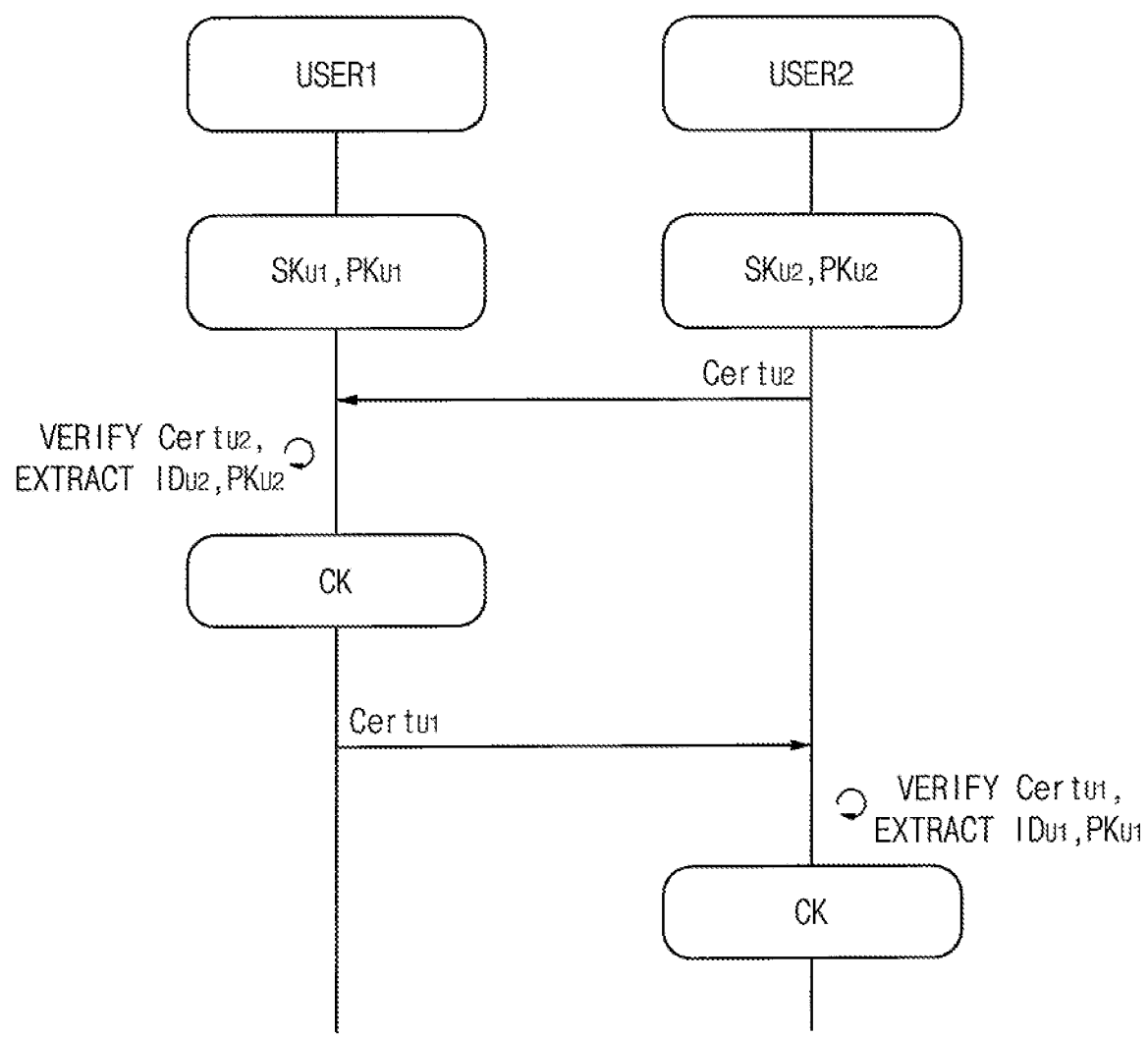
FIG. 2 illustrates an example of information exchange for the a method of FIG. 1.

FIG. 1 is a flowchart illustrating an embodiment of a method of performing a key exchange for a security operation in a storage device. FIG. 2 is an example of an exchange of information that may be performed for the method of FIG. 1.

Referring to FIGS. 1 and 2, the method may be performed or executed in a storage device that is accessed by a plurality of user identifications (IDs), which may include a first user ID and a second user ID that are different from each other. The storage device includes a plurality of memories (e.g., nonvolatile memories) to store data and a storage controller to control operations of the nonvolatile memories. The storage device may further include a trusted third party (TTP) to perform a key exchange. Embodiments of the storage device and a storage system including the storage device are described with reference to FIG. 3.

The key exchange method includes, at S100, generating a first certificate $Cert_{U1}$ based on a user ID ($ID_{U1}$) of a first user and a first public key $PK_{U1}$ for the first user ID $ID_{U1}$.

At S200, a second certificate $Cert_{U2}$ is generated based on a user ID ($ID_{U2}$) of a second user and a second public key $PK_{U2}$ for the second user ID $ID_{U2}$. Embodiments of operations S100 and S200 are described with reference to FIGS. 6, 7, 8A and 8B.

Operations S100 and S200 may be performed, for example, by the TTP in the storage device. The TTP may be used to securely and/or safely perform the key exchange. For example, the TTP may generate the first certificate $Cert_{U1}$ and the second certificate $Cert_{U2}$ for user authentication, and thus may be used to prevent or block performance of the key exchange with an unauthorized or invalid user.

In some example embodiments (e.g., as described with reference to FIG. 3), the TTP may be included in the storage controller, which may be in or coupled to the storage device. In other example embodiments (e.g., as described with reference to FIG. 22), the TTP may be disposed or located outside and coupled to the storage controller. In one embodiment (e.g., as described with reference to FIG. 23), the TTP may be disposed or located outside and coupled to the storage device.

At S300, while the storage device is accessed by the first user ID $ID_{U1}$, a first verification is performed on the second certificate $Cert_{U2}$ based on a third certificate in the TTP.

At S400, when the first verification is successfully completed, a ciphering key CK is derived based on a first private key $SK_{U1}$ for the first user ID $ID_{U1}$ and the second public key $PK_{U2}$ for the second user ID $ID_{U2}$ obtained by the first verification. Embodiments of operations S300 and S400 are described with reference to FIGS. 9 to 11.

The third certificate may be different from the first certificate $Cert_{U1}$ and the second certificate $Cert_{U2}$. In one embodiment, the third certificate may be used to check or confirm whether the second certificate $Cert_{U2}$ is a certificate signed by the TTP, as in operation S300. Based on the first verification, for example, the check may be performed based on whether the second user ID $ID_{U2}$ and the second user corresponding the second user ID $ID_{U2}$ is an authorized or legitimate user.

At S500, while the storage device is accessed by the second user ID $ID_{U2}$, a second verification is performed on the first certificate $Cert_{U1}$ based on the third certificate.

At S600, when the second verification is successfully completed, the ciphering key CK is derived based on a second private key $SK_{U2}$ for the second user ID $ID_{U2}$ and the first public key $PK_{U1}$ for the first user ID $ID_{U1}$ obtained by the second verification. Embodiments of operations S500 and S600 are described with reference to FIGS. 12 to 14.

The third certificate may be used to check or confirm whether the first certificate $Cert_{U1}$ is a certificate signed by the TTP, as in operation S500. Based on the second verification, a check may be performed based on whether the first user ID $ID_{U1}$ and the first user corresponding the first user ID $ID_{U1}$ is an authorized or legitimate user.

Referring to FIG. 2, at an initial operation time, the first user (e.g., first user ID $ID_{U1}$) may have the first private key $SK_{U1}$ and the first public key $PK_{U1}$, and the second user (e.g., second user ID $ID_{U2}$) may have the second private key $SK_{U2}$ and the second public key $PK_{U2}$. When operations S100 and S200 are performed, the first certificate $Cert_{U1}$ and the second certificate $Cert_{U2}$ may be obtained. When operations S300 and S400 are performed, the first user may obtain the ciphering key CK. When operations S500 and S600 are performed, the second user may obtain the ciphering key CK. For example, the first private key $SK_{U1}$, the first public key $PK_{U1}$, the second private key $SK_{U2}$, the second public key $PK_{U2}$, the first certificate $Cert_{U1}$ and the second certificate $Cert_{U2}$ may be stored in a key slot.

In some example embodiments, the security (or secure) operation may be performed using the ciphering key CK obtained by the key exchange. For example, the security operation may include an operation of transferring authority (e.g., an access authority or right) to a specific storage region, an embodiment of which is described with reference to FIG. 15. However, example embodiments are not limited thereto, and the security operation may include at least one of various other operations.

In some example embodiments, the ciphering key CK that is derived based on the first private key $SK_{U1}$ and the second public key $PK_{U2}$ in operation S400 may be substantially the same as the ciphering key CK that is derived based on the second private key $SK_{U2}$ and the first public key $PK_{U1}$ in operation S600.

In some example embodiments, the key exchange may be performed based on a Diffie-Hellman (DH) scheme and/or an elliptic curve Diffie-Hellman (ECDH) scheme. For example, it may be assumed that the first private key $SK_{U1}$ is "a", the first public key $PK_{U1}$ is "$g^a$ mod p", the second private key $SK_{U2}$ is "b", and the second public key $PK_{U2}$ is "$g^b$ mod p", where "p" is a prime number, "g" is an integer greater than or equal to one and less than or equal to "(p−1)", each of "a" and "b" is an integer greater than or equal to one and less than or equal to "(p−2)", and "mod" represents a modular operation. In this example, the first certificate $Cert_{U1}$ may be "$ID_{U1}|PK_{U1}|Sign\{SK_{TTP}, ID_{U1}|PK_{U1}\}$", the second certificate $Cert_{U2}$ may be "$ID_{U2}|PK_{U2}|Sign\{SK_{TTP}, ID_{U2}|PK_{U2}\}$", the ciphering key CK derived in operation S400 may be "$(g^b)^a$ mod p", the ciphering key CK derived in operation S600 may be "$(g^a)^b$ mod p", and thus the same ciphering key may be obtained in operations S400 and S600. However, example embodiments are not limited thereto, and the key exchange may be performed based on one or more other algorithms.

Although FIG. 2 illustrates that the first certificate $Cert_{U1}$ and the second certificate $Cert_{U2}$ are transmitted between the first user (e.g., first user ID $ID_{U1}$) and the second user (e.g., second user ID $ID_{U2}$), variations are possible. For example, in one embodiment the storage device may not be accessed by two or more users (e.g., two or more user IDs) at the same time, and may be accessed by only one user (e.g., one user ID) at a specific time. While the storage device is accessed by the first user (e.g., in a state that the storage device is logged in using the first user ID $ID_{U1}$), operations S100, S300 and S400 may be performed sequentially and/or at once based on the first private key $SK_{U1}$, the first public key $PK_{U1}$, the second private key $SK_{U2}$ and the second public key $PK_{U2}$ stored in the key slot. While the storage device is accessed by the second user (e.g., in a state that the storage device is logged in using the second user ID $ID_{U2}$), operations S200, S500 and S600 may be performed sequentially and/or at once based on the first private key $SK_{U1}$, the first public key $PK_{U1}$, the second private key $SK_{U2}$ and the second public key $PK_{U2}$ stored in the key slot.

It should also be noted that in some implementations, the operations noted in the blocks may occur out of the order noted in the flowcharts. For example, two blocks shown in succession may in fact be executed substantially concurrently or the blocks may be executed in reverse order, for example, depending upon the operations involved.

In the method of performing key exchange for security operation in the storage device according to example embodiments, the TTP may be used to securely and/or safely perform the key exchange. The first certificate $Cert_{U1}$ and the second certificate $Cert_{U2}$ for the user authentication may be generated by the TTP. The first user (e.g., the first user ID $ID_{U1}$) may not derive the ciphering key CK based on the second public key $PK_{U2}$ for the second user (e.g., the second user ID $ID_{U2}$), but may authenticate the second public key $PK_{U2}$ based on the second certificate $Cert_{U2}$ for the second user signed by the TTP and may derive the ciphering key CK based on the authenticated second public key $PK_{U2}$. Accordingly, the key exchange with the unauthorized or invalid user may be prevented or blocked, the key exchange may be performed with only the authorized or legitimate user, and thus the storage device may have the improved or enhanced security performance.

Figure 3:
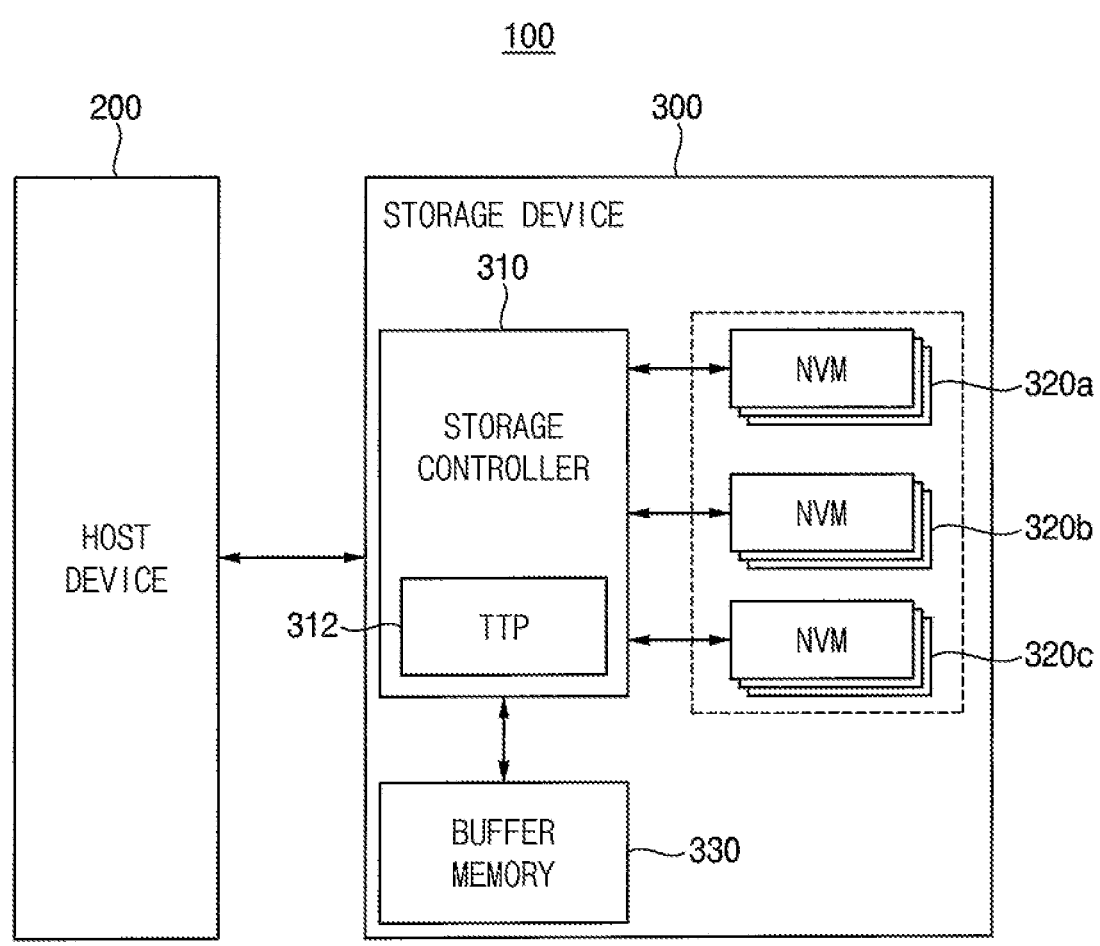
FIG. 3 illustrates an embodiment of a storage system.

FIG. 3 is a block diagram illustrating an embodiment of a storage system 100 including a host device 200 and a storage device 300. The host device 200 may control overall operation of the storage system 100 and, for example, may include a host processor and a host memory. The host processor may control operation of the host device 200, for example, based on execution of an operating system (OS). The host memory may store instructions and/or data executed and/or processed by the host processor. The operating system executed by the host processor may include, for example, a file system for file management and a device driver for controlling peripheral devices including the storage device 300 at the operating system level.

The storage device 300 is accessed by the host device 200 and may include a storage controller 310, a plurality of nonvolatile memories (NVMs) 320a, 320b and 320c, and a buffer memory 330. The storage controller 310 may control operation of the storage device 300 and/or operations of the nonvolatile memories 320a, 320b and 320c based on commands and data from the host device 200. The storage controller 310 includes a TTP 312. As described with reference to FIG. 1, TTP 312 may be used to securely and/or safely perform key exchange.

The nonvolatile memories 320a, 320b and 320c may store data, including, for example, meta data, user data, and/or other information. As described with reference to FIG. 5, the nonvolatile memories 320a, 320b and 320c may be divided into a plurality of storage regions.

In some example embodiments, each of the nonvolatile memories 320a, 320b and 320c may include a NAND flash memory. In other embodiments, each of the nonvolatile memories 320a, 320b and 320c may include one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or another type of memory.

The buffer memory 330 may store instructions and/or data that are executed and/or processed by the storage controller 310, and may temporarily store data stored in or to be stored into the nonvolatile memories 320a, 320b and 320c. For example, the buffer memory 330 may include at least one of various types of volatile memories, e.g., a dynamic random access memory (DRAM) or another type of memory.

As described with reference to FIGS. 1 and 2, the storage device 300 may be accessed by one of a plurality of user IDs via the host device 200. For example, when the first user ID $ID_{U1}$ and a first password corresponding to the first user ID $ID_{U1}$ are input via the host device 200, the storage device 300 may be accessed by the first user ID $ID_{U1}$ and the first user corresponding to the first user ID $ID_{U1}$. When the second user ID $ID_{U2}$ and a second password corresponding to the second user ID $ID_{U2}$ are input via the host device 200, the storage device 300 may be accessed by the second user ID $ID_{U2}$ and the second user corresponding to the second user ID $ID_{U2}$.

The storage controller 310 and the TTP 312 execute the method of performing key exchange according to example embodiments described with reference to FIGS. 1 and 2. For example, the storage controller 310 includes at least one processor for performing the security operation, and the processor and the TTP 312 may generate the first certificate $Cert_{U1}$ and the second certificate $Cert_{U2}$. While the storage device 300 is accessed by the first user ID $ID_{U1}$, the processor performs the first verification on the second certificate $Cert_{U2}$ based on the certificate of the TTP 312, and derives the ciphering key CK when the first verification is successfully completed. While the storage device 300 is accessed by the second user ID $ID_{U2}$, the processor performs the second verification on the first certificate $Cert_{U1}$ based on the certificate of the TTP 312 and derives the ciphering key CK when the second verification is successfully completed. In addition, the storage controller 310 and the TTP 312 may perform or execute a method of performing authority transfer according to embodiments as described with reference to FIGS. 15 and 21.

In one embodiments, the storage device 300 may be a solid state drive (SSD). For example, the storage device 300 may be implemented in the form of a self-encrypting drive (SED). In one embodiment, the storage device 300 may be a universal flash storage (UFS), a multi media card (MMC) or an embedded multi media card (eMMC). In one embodiment, the storage device 300 may be one of a secure digital (SD) card, a micro SD card, a memory stick, a chip card, a universal serial bus (USB) card, a smart card, a compact flash (CF) card, or another type of storage device.

In some example embodiments, the storage device 300 may be connected to the host device 200 via a block accessible interface which may include, for example, a UFS, an eMMC, a serial advanced technology attachment (SATA) bus, a nonvolatile memory express (NVMe) bus, a serial attached SCSI (SAS) bus, or the like. The storage device 300 may use a block accessible address space corresponding to an access size of the nonvolatile memories 320a, 320b and 320c to provide the block accessible interface to the host device 200, and to allow the access (e.g., by units of a memory block) with respect to data stored in the nonvolatile memories 320a, 320b and 320c.

In some example embodiments, the storage system 100 may be any type of computing system, e.g., a personal computer (PC), a server computer, a data center, a workstation, a digital television, a set-top box, a navigation system, etc. In some embodiments, the storage system 100 may be any type of mobile system. Examples include a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

Figure 4:
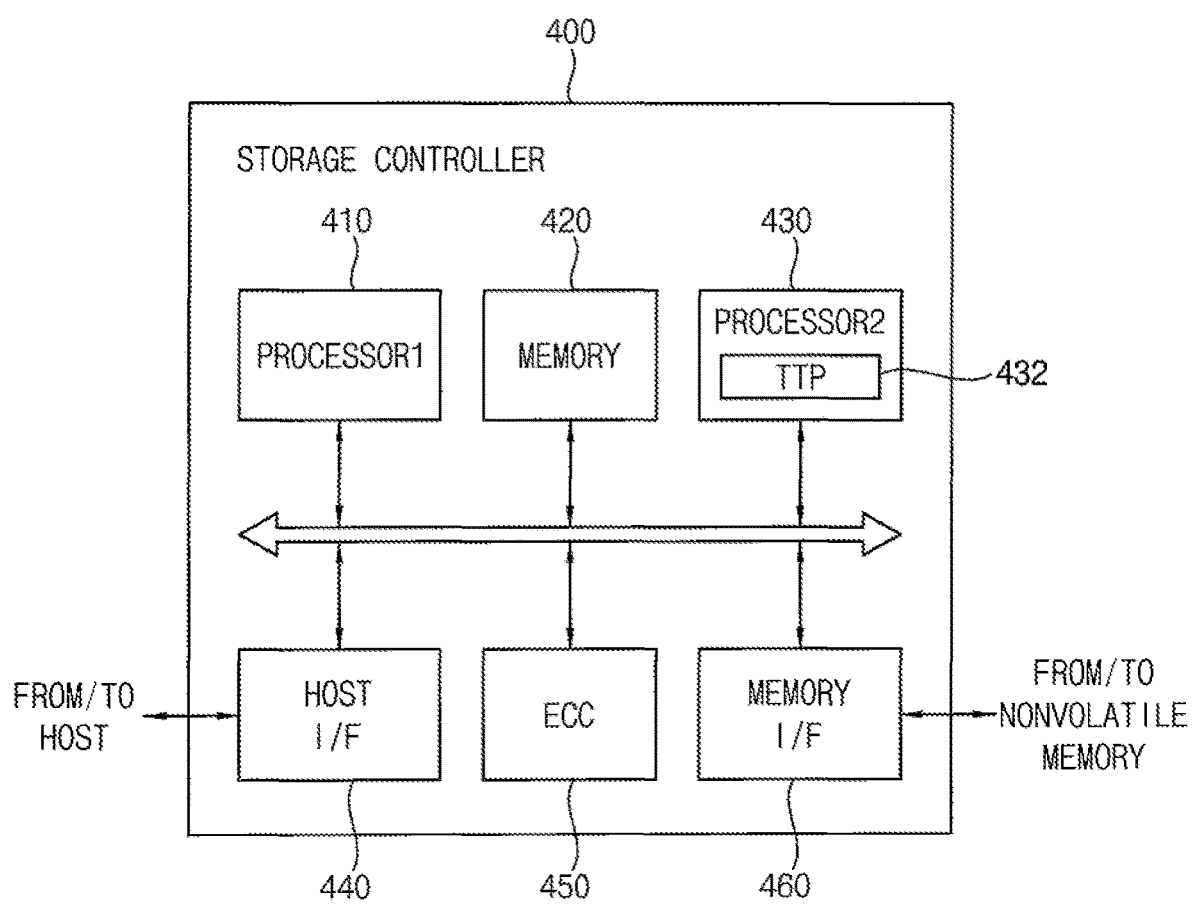
FIG. 4 illustrates an embodiment of a storage controller.

FIG. 4 is a block diagram illustrating an embodiment of a storage controller 400 in or coupled to a storage device.

Referring to FIG. 4, a storage controller 400 may include a first processor 410, a memory 420, a second processor 430, a host interface 440, an error correction code (ECC) block 450 and a memory interface 460. The first processor 410 and the second processor 430 may control an operation of the storage controller 400 in response to a command received via the host interface 440 from a host device (e.g., host device 200 in FIG. 3). For example, the first processor 410 may control a normal operation of a storage device (e.g., storage device 300 in FIG. 3), and may control respective components by employing firmware or other instructions for operating the storage device. For example, the second processor 430 may control a security operation of the storage device and may include a TTP 432. The second processor 430 and the TTP 432 may correspond to the processor and the TTP 312 in or coupled to the storage controller 310 of FIG. 3.

The second processor 430 may process and/or may store security data such as a cryptographic key, sensitive data, a sensitive code, or the like.

The memory 420 may store instructions and data executed and processed by the first processor 410 and the second processor 430. For example, the memory 420 may be implemented with a volatile memory with relatively small capacity and high speed, such as a static random access memory (SRAM), a cache memory, or the like.

The ECC block (or logic) 450 may perform coded modulation for error correction using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The host interface 440 may provide physical connections between the host device and the storage device. The host interface 440 may provide an interface corresponding to a bus format of the host device for communication between the host device and the storage device. In some example embodiments, the bus format of the host device may be a small computer system interface (SCSI) or a serial attached SCSI (SAS) interface. In some example embodiments, the bus format of the host device may be a USB, a peripheral component interconnect (PCI) express (PCIe), an advanced technology attachment (ATA), a parallel ATA (PATA), a serial ATA (SATA), a nonvolatile memory (NVM) express (NVMe), etc., format.

The memory interface 460 may exchange data with nonvolatile memories (e.g., nonvolatile memories 320a, 320b and 320c in FIG. 3). The memory interface 460 may transfer data to the nonvolatile memories or may receive data read from the nonvolatile memories. In some example embodiments, the memory interface 460 may be connected to the nonvolatile memories via one channel. In some example embodiments, the memory interface 460 may be connected to the nonvolatile memories via two or more channels.

Figure 5:
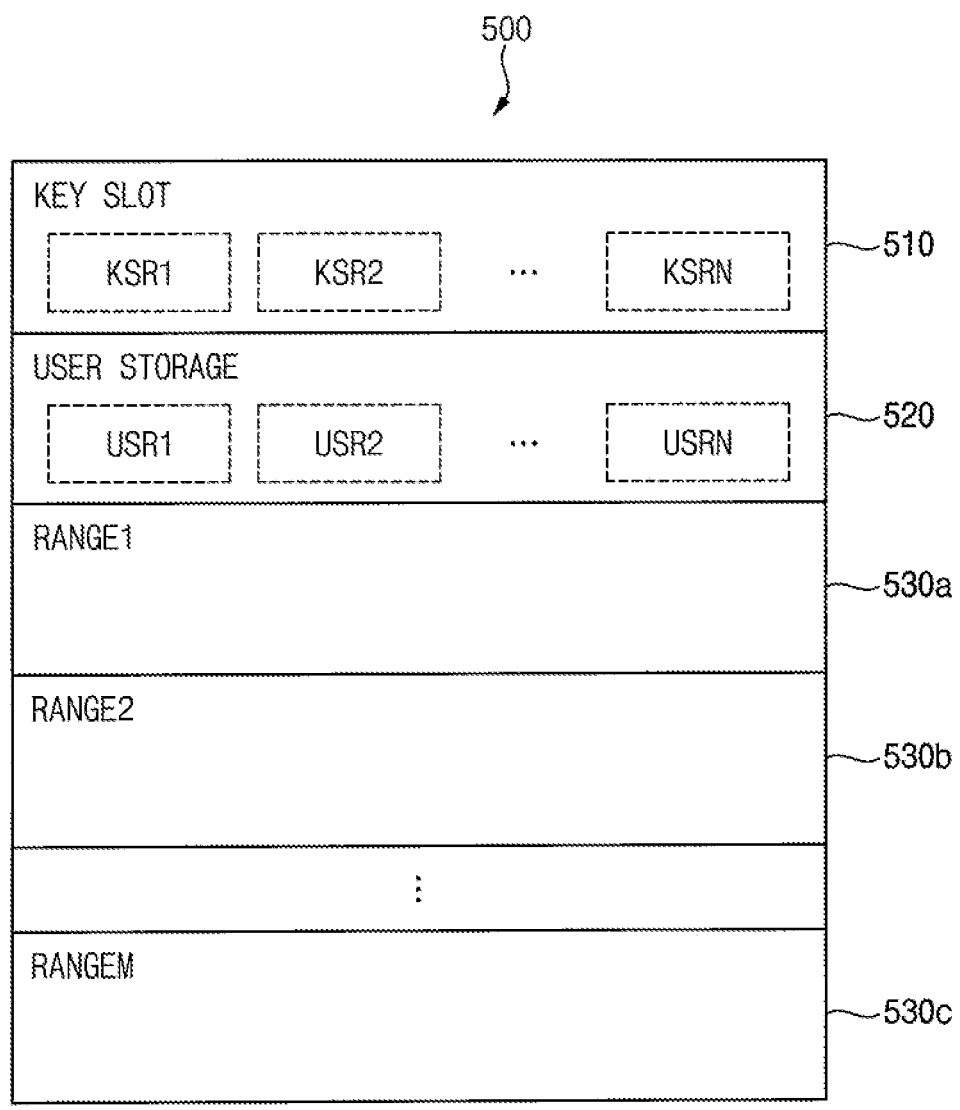
FIG. 5 illustrates an example of a storage space in a storage device.

FIG. 5 is a diagram illustrating an example of a storage space 500 in a storage device, e.g., storage device 300 of FIG. 3. The storage space 500 may include a key slot 510, a user-dedicated storage region 520 and a plurality of storage regions (RANGE1, RANGE2, . . . , RANGEM) 530a, 530b and 530c.

In some example embodiments, the storage space 500 may include nonvolatile memories (e.g., nonvolatile memories 320a, 320b and 320c in FIG. 3) which are logically divided. However, example embodiments are not limited thereto, and the storage space 500 may further include a storage space of a buffer memory (e.g., buffer memory 330 in FIG. 3) in the storage device and/or a processing space of a processor (e.g., processors 410 and 430 in FIG. 4) in a storage controller (e.g., storage controller 400 of FIG. 4) used to access the nonvolatile memories.

The key slot 510 may be a region in which keys and certificates of a plurality of users and user IDs are allocated and/or stored. For example, the user IDs may be capable of accessing the storage device and may include first through N-th user IDs, where N is a natural number greater than or equal to two. For example, the key slot 510 may include first through N-th key slot regions (KSRs) KSR1, KSR2, . . . , KSRN that correspond and are allocated to the first through N-th user IDs, respectively. For example, the first key slot region KSR1 may correspond to the first user ID and may be allocated to the first user ID.

The key slot 510 and the key slot regions KSR1, KSR2, . . . , KSRN may be accessed by all (or predetermined) users and all (or predetermined) user IDs. However, as will be described with reference to FIGS. 8A and 8B, each key may be stored in encrypted and/or wrapped state and thus the encrypted and/or wrapped key may be used only by an authorized user.

The user-dedicated storage region 520 may be a region used by the users and user IDs to perform the security operation and/or calculation. For example, the user-dedicated storage region 520 may include first through N-th user storage regions (USRs) USR1, USR2, . . . , USRN that correspond and are allocated to the first through N-th user IDs, respectively. For example, the first user storage region USR1 may correspond to the first user ID and may be allocated to the first user ID.

In some embodiments, each of the user storage regions USR1, USR2, . . . , USRN may be accessed only by a specific user and user ID. For example, the first user storage region USR1 may be accessed only by the first user ID. In some embodiments, user-dedicated storage region 520 may further include a region that is commonly accessed by all (or predetermined) users and all (or predetermined) user IDs.

The storage regions 530a, 530b and 530c may store data (e.g., normal data, security data, etc.), each of the storage regions 530a, 530b and 530c may be referred to as a range, a partition, or the like. Each of the storage regions 530a, 530b and 530c may be accessed only by a user and a user ID having an access authority. For example, when the first user ID has a first access authority to the first storage region 530a and when the second user ID does not have the first access authority, the first storage region 530a may be accessed by the first user ID and may not be accessed by the second user ID. As described with reference to FIG. 15, the first access authority may be transferred to the second user ID.

Hereinafter, example embodiments will be described in detail based on the Diffie-Hellman scheme. However, example embodiments are not limited thereto, and example embodiments may be implemented based on at least one of various other algorithms.

Figure 6:
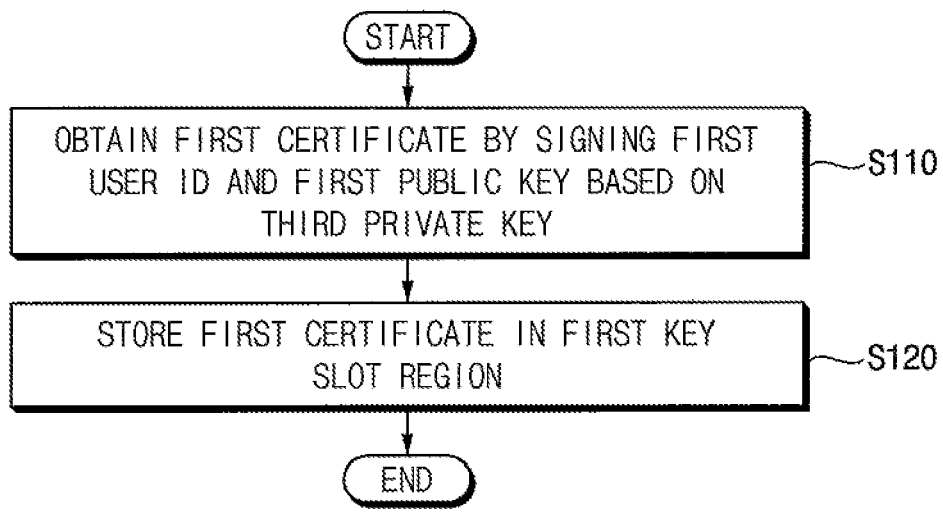
FIG. 6 illustrates an example of an operation of generating a first certificate.
Figure 7:
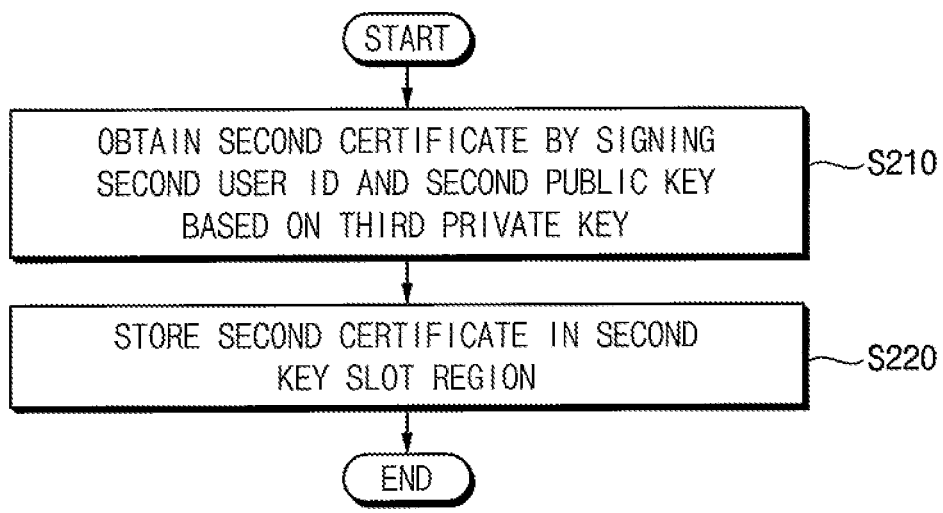
FIG. 7 illustrates an example of generating a second certificate.
Figure 8A:
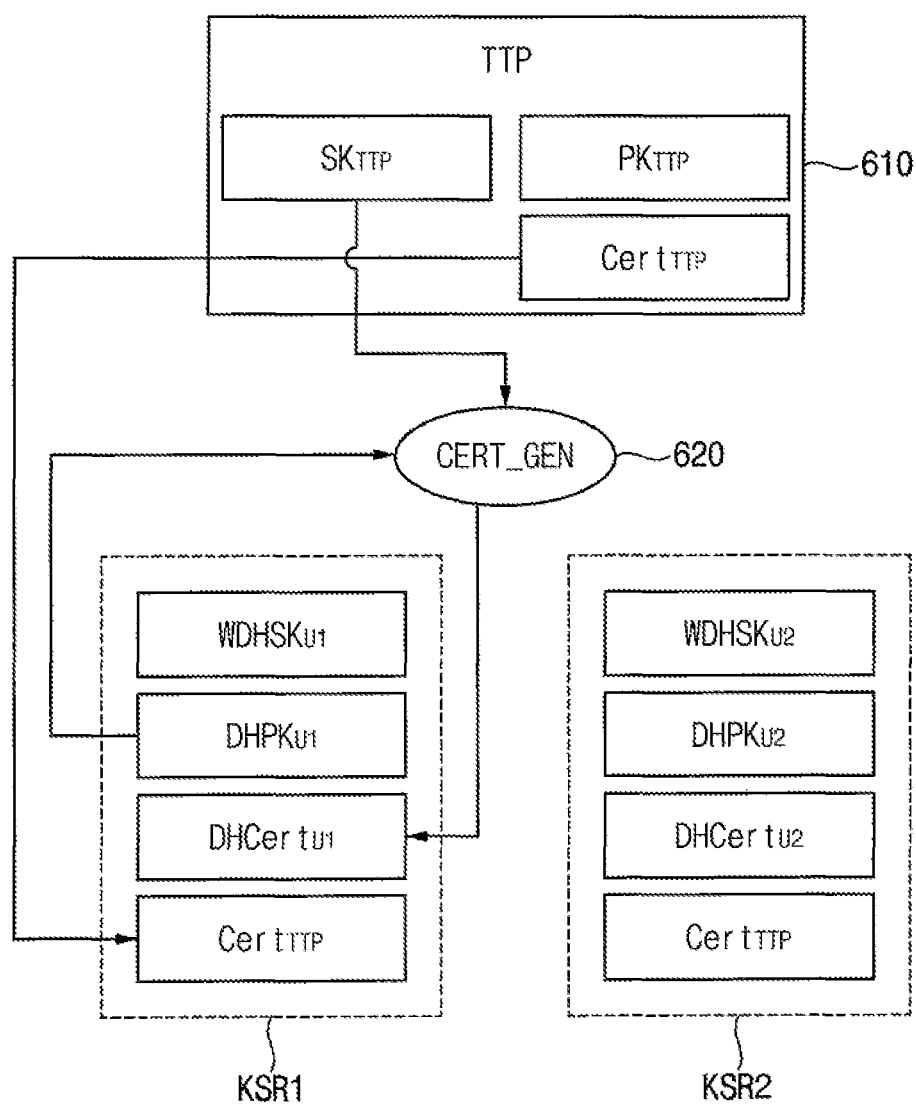
FIGS. 8A and 8B illustrate examples to describe the operations of FIGS. 6 and 7.
Figure 8B:
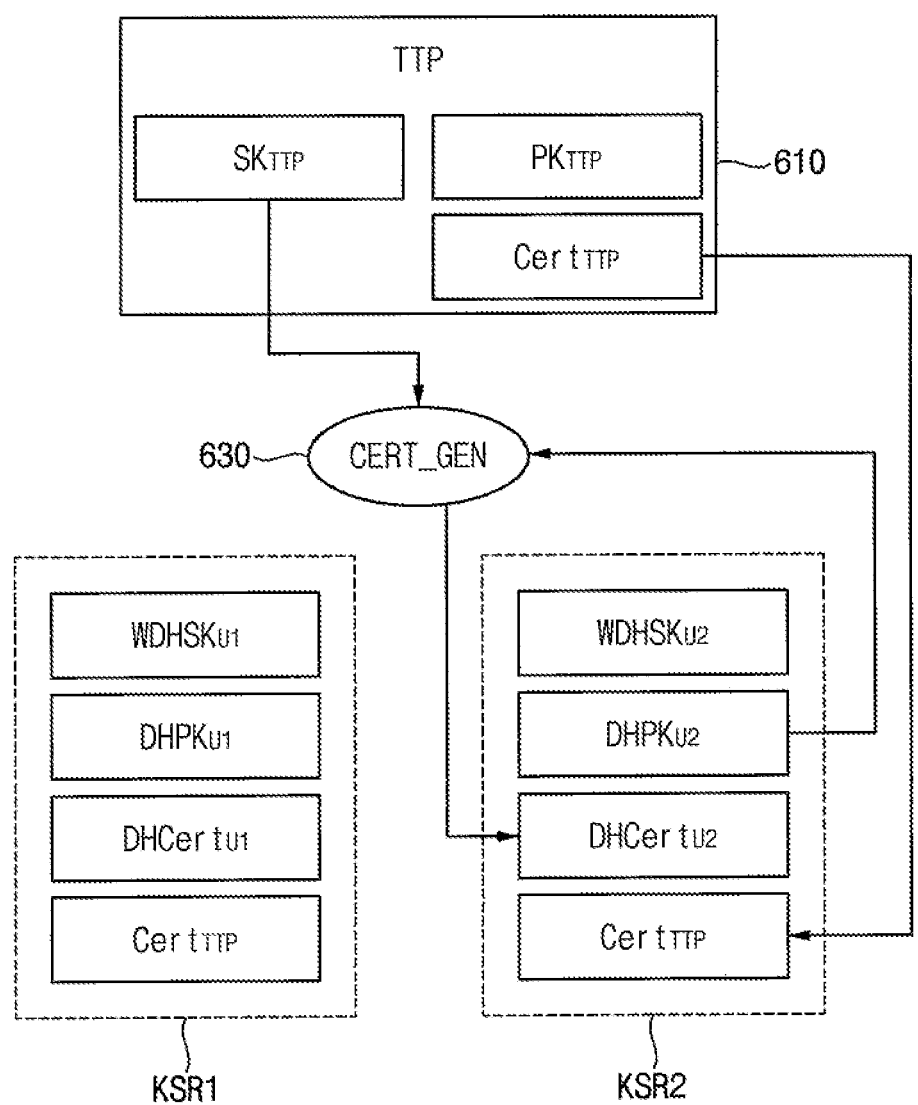

FIG. 6 is a flowchart illustrating an embodiment of an operation of generating a first certificate in FIG. 1. FIG. 7 is a flowchart illustrating an embodiment of generating a second certificate in FIG. 1. FIGS. 8A and 8B are diagrams illustrating examples for describing the operations of FIGS. 6 and 7.

As illustrated in FIGS. 8A and 8B, the first user and the first user ID $ID_{U1}$ may have a first private key $WDHSK_{U1}$ and a first public key $DHPK_{U1}$. The second user and the second user ID $ID_{U2}$ may have a second private key $WDHSK_{U2}$ and a second public key $DHPK_{U2}$. A TTP 610 may have a third private key $SK_{TTP}$, a third public key $PK_{TTP}$ and a third certificate $Cert_{TTP}$. At an initial operation time, the first private key $WDHSK_{U1}$ and the first public key $DHPK_{U1}$ may be stored in the first key slot region KSR1 allocated to the first user ID $ID_{U1}$. The second private key $WDHSK_{U2}$ and the second public key $DHPK_{U2}$ may be stored in the second key slot region KSR2 allocated to the second user ID $ID_{U2}$. The third private key $SK_{TTP}$, the third public key $PK_{TTP}$ and the third certificate $Cert_{TTP}$ may be stored in the TTP 610. An operation of generating the third certificate $Cert_{TTP}$ including the third public key $PK_{TTP}$ may be performed in advance.

Referring to FIGS. 1, 6 and 8A, at S110, when generating a first certificate $DHCert_{U1}$ (e.g., operation S100), the first certificate $DHCert_{U1}$ may be obtained by signing the first user ID $ID_{U1}$ and the first public key $DHPK_{U1}$ for the first user ID $ID_{U1}$ based on the third private key $SK_{TTP}$ in the TTP 610. For example, the first certificate $DHCert_{U1}$ may be "$ID_{U1}|DHPK_{U1}|Sign\{SK_{TTP}, ID_{U1}|DHPK_{U1}\}$". A certificate generating operation (CERT_GEN) 620 in FIG. 8A may correspond to operation S110 in FIG. 6.

At S120, the first certificate $DHCert_{U1}$ may be stored in the first key slot region KSR1. In addition, the third certificate $Cert_{TTP}$ may also be stored in the first key slot region KSR1. Thus, after operation S100 (including S110 and S120) is completed, the first certificate $DHCert_{U1}$ may be stored with the first private key $WDHSK_{U1}$, the first public key $DHPK_{U1}$ and the third certificate $Cert_{TTP}$ in the first key slot region KSR1.

Referring to FIGS. 1, 7 and 8B, at S210, when generating a second certificate $DHCert_{U2}$ (e.g., operation S200), the second certificate $DHCert_{U2}$ may be obtained by signing the second user ID $ID_{U2}$ and the second public key $DHPK_{U2}$ for the second user ID $ID_{U2}$ based on the third private key $SK_{TTP}$ included in the TTP 610. Operation S210 may be similar to operation S110 in FIG. 6. A certificate generating operation (CERT_GEN) 630 in FIG. 8B may correspond to operation S210 in FIG. 7.

At S220, the second certificate $DHCert_{U2}$ may be stored in the second key slot region KSR2. Operation S220 may be similar to operation S120 in FIG. 6. Thus, after operation S200 (including S210 and S220) is completed, the second certificate $DHCert_{U2}$ may be stored together with the second private key $WDHSK_{U2}$, the second public key $DHPK_{U2}$ and the third certificate $Cert_{TTP}$ in the second key slot region KSR2.

In some example embodiments, each of the first private key $WDHSK_{U1}$ and the second private key $WDHSK_{U2}$ may be a wrapped key. Thus, even if all (or predetermined ones) of the user IDs including the first user ID $ID_{U1}$ and the second user ID $ID_{U2}$ may access the first private key $WDHSK_{U1}$ and the second private key $WDHSK_{U2}$, only the first user ID $ID_{U1}$ having unwrapping authority for the first private key $WDHSK_{U1}$ may use the first private key $WDHSK_{U1}$, and only the second user ID $ID_{U2}$ having unwrapping authority for the second private key $WDHSK_{U2}$ may use the second private key $WDHSK_{U2}$.

In some example embodiments, the above-described operations of generating the certificate and storing the certificate in the key slot may be performed for all (or predetermined) user IDs (or all user accounts) in the same manner.

Figure 9:
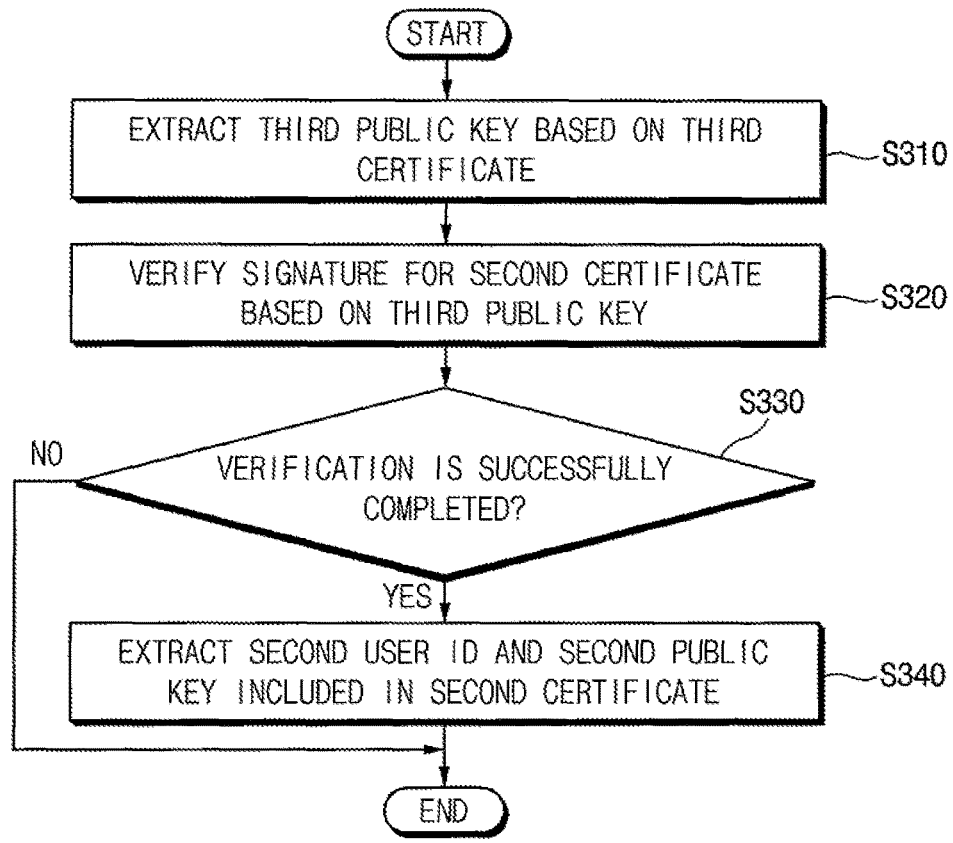
FIG. 9 illustrates an example of an operation of performing a first verification.
Figure 10:
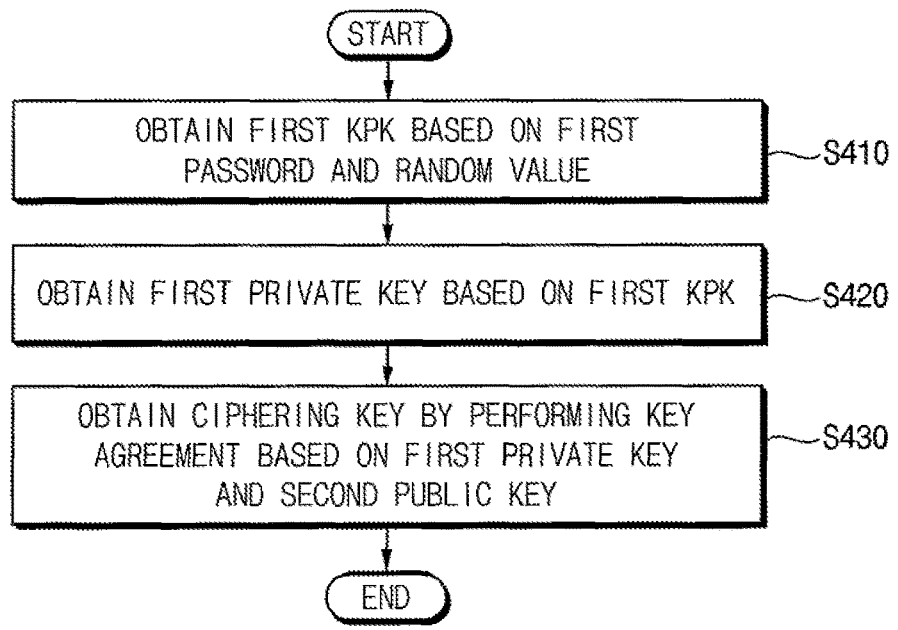
FIG. 10 illustrates an example of an operation of deriving a ciphering key.
Figure 11:
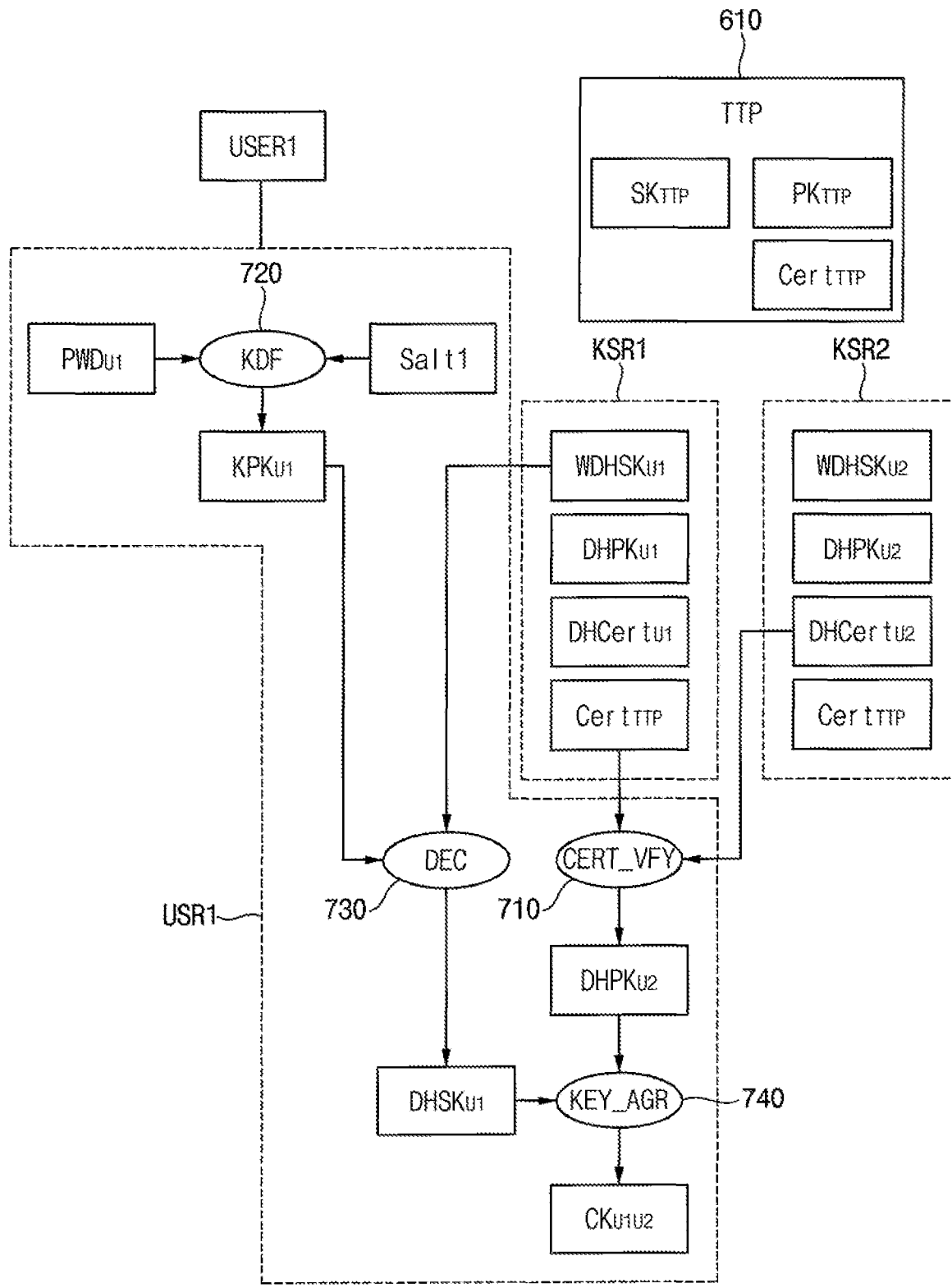
FIG. 11 illustrates an example to describe the operations of FIGS. 9 and 10.

FIG. 9 is a flowchart illustrating an embodiment of an operation of performing a first verification in FIG. 1. FIG. 10 is a flowchart illustrating an embodiment of an operation of deriving a ciphering key based on a first private key and a second public key in FIG. 1. FIG. 11 is a diagram illustrating an example for describing the operations of FIGS. 9 and 10.

Referring to FIGS. 1, 9 and 11, at S300, when performing the first verification while the storage device is accessed by the first user ID $ID_{U1}$, the first user may log in the storage device using the first user ID $ID_{U1}$ and a first password $PWD_{U1}$ corresponding to the first user ID $ID_{U1}$, and the second certificate $DHCert_{U2}$ stored in the second key slot region KSR2 may be loaded.

At S310, after that, the third public key $PK_{TTP}$ in the TTP 610 may be extracted based on the third certificate $Cert_{TTP}$.

At S320, a signature for the second certificate $DHCert_{U2}$ may be verified based on the third public key $PK_{TTP}$. A certificate verifying operation (CERT_VFY) 710 in FIG. 11 may correspond to operations S310 and S320 in FIG. 9.

At S330, when a verification on the signature for the second certificate $DHCert_{U2}$ is successfully completed (step S330: YES), it may be determined that the second user corresponding to the second user ID $ID_{U2}$ is an authorized or legitimate user.

At S340, the second user ID $ID_{U2}$ and the second public key $DHPK_{U2}$ in the second certificate $DHCert_{U2}$ may be therefore be extracted. When the verification on the signature for the second certificate $DHCert_{U2}$ has failed (step S330: NO), it may be determined that the second user corresponding to the second user ID $ID_{U2}$ is an unauthorized or invalid user, and thus the process may be terminated.

Referring to FIGS. 1, 10 and 11, in S400, deriving a ciphering key $CK_{U1U2}$ is performed based on the first private key $WDHSK_{U1}$ and the second public key $DHPK_{U2}$ when the first verification is successfully completed. At S410, a first key-protection-key (KPK) $KPK_{U1}$ may be obtained based on the first password $PWD_{U1}$ corresponding to the first user ID $ID_{U1}$ and a random value Salt1. For example, as illustrated in FIG. 11, the first KPK $KPK_{U1}$ may be derived using a key derivation function (KDF) 720. For example, operation S410 may be performed at a time point at which the first user logs in the storage device using the first user ID $ID_{U1}$ and the first password $PWD_{U1}$.

At S420, a first private key $DHSK_{U1}$ that is an unwrapped key, may be obtained based on the first KPK $KPK_{U1}$. For example, as illustrated in FIG. 11, the unwrapped first private key $DHSK_{U1}$ may be generated by performing a decrypting operation (DEC) 730 on the first private key $WDHSK_{U1}$ that is the wrapped key based on the first KPK $KPK_{U1}$. For example, the decrypting operation 730 may be performed based on an advanced encryption standard (AES) algorithm.

At S430, the ciphering key $CK_{U1U2}$ may be obtained by performing a key agreement based on the first private key $DHSK_{U1}$ for the first user ID $ID_{U1}$ and the second public key $DHPK_{U2}$ for the second user ID $ID_{U2}$ obtained by the first verification. A key agreement operation (KEY_AGR) 740 in FIG. 11 may correspond to operation S430 in FIG. 10.

In some example embodiments, the first verification and the operation of deriving the ciphering key $CK_{U1U2}$ based on the first private key $DHSK_{U1}$ and the second public key $DHPK_{U2}$ may be performed using the first user storage region USR1 that is accessed only by the first user ID $ID_{U1}$.

Figure 12:
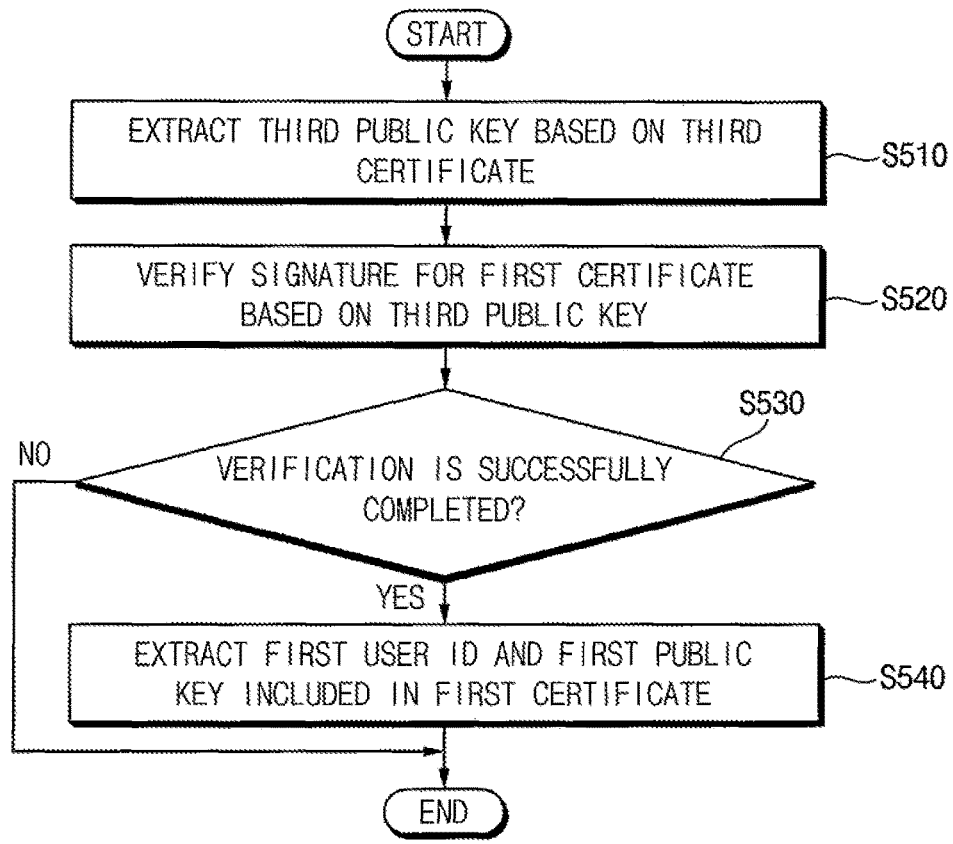
FIG. 12 illustrates an example of an operation of performing a second verification.
Figure 13:
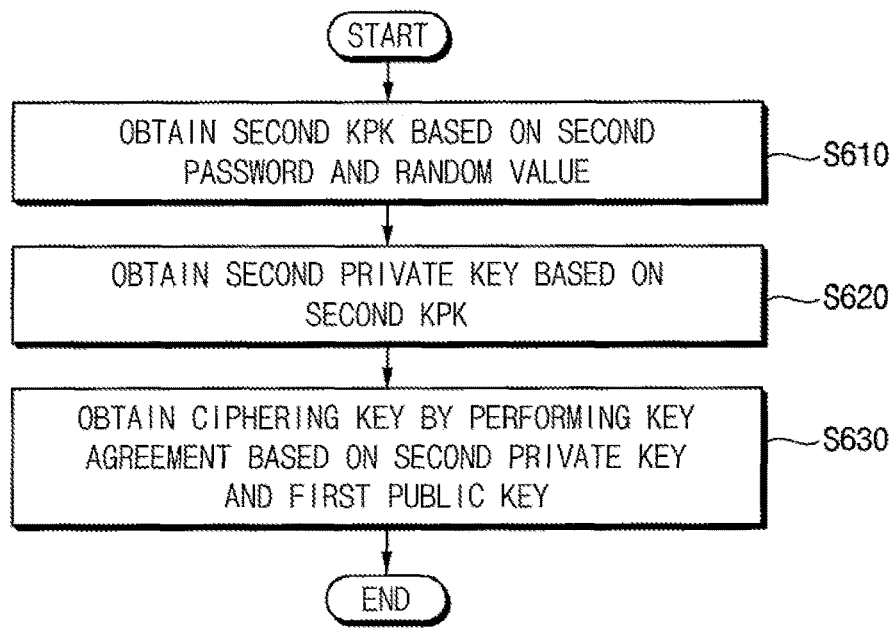
FIG. 13 illustrates an example of an operation of deriving a ciphering key.
Figure 14:
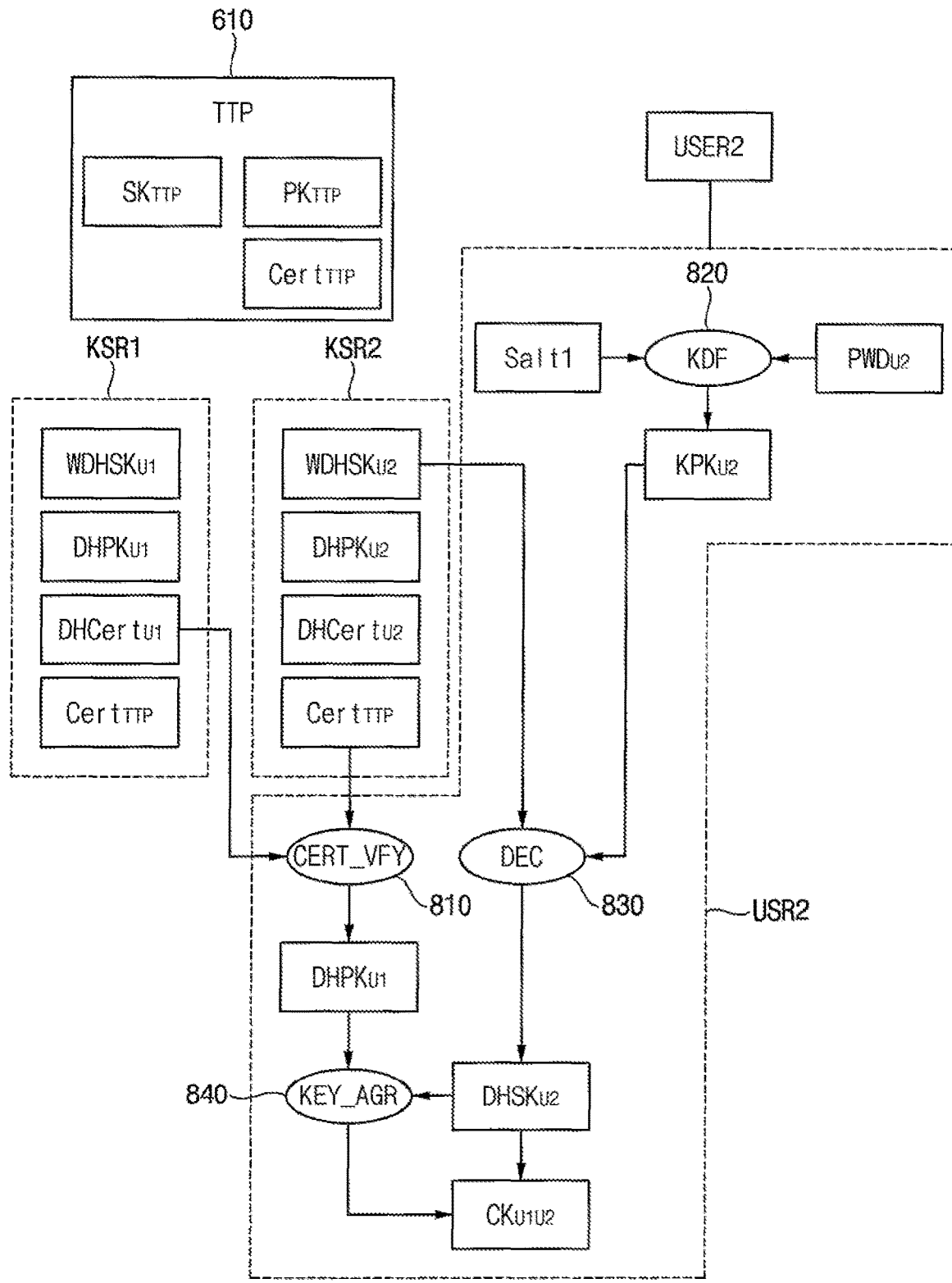
FIG. 14 illustrates an example to describe the operations of FIGS. 12 and 13.

FIG. 12 is a flowchart illustrating an embodiment of an operation of performing a second verification in FIG. 1. FIG. 13 is a flowchart illustrating an embodiment of an operation of deriving a ciphering key based on a second private key and a first public key in FIG. 1. FIG. 14 is a diagram illustrating an example for describing the operations of FIGS. 12 and 13.

Referring to FIGS. 1, 12 and 14, in S500, the second verification is performed while the storage device is accessed by the second user ID $ID_{U2}$. At this time, the second user may log in the storage device using the second user ID $ID_{U2}$ and a second password $PWD_{U2}$ corresponding to the second user ID $ID_{U2}$, and the first certificate $DHCert_{U1}$ stored in the first key slot region KSR1 may be loaded.

At S510, after that, extracting the third public key $PK_{TTP}$ in the TTP 610 may be extracted based on the third certificate $Cert_{TTP}$.

At S520, a signature for the first certificate $DHCert_{U1}$ may be verified based on the third public key $PK_{TTP}$. Operations S510 and S520 may be similar to operations S310 and S320 in FIG. 9, respectively. A certificate verifying operation (CERT_VFY) 810 in FIG. 14 may correspond to operations S510 and S520 in FIG. 12.

At S530, a determination is made as to whether verification is successfully completed.

At S540, when verification on the signature for the first certificate $DHCert_{U1}$ is successfully completed (S530: YES), the first user ID $ID_{U1}$ and the first public key $DHPK_{U1}$ in the first certificate $DHCert_{U1}$ may be extracted. When the verification on the signature for the first certificate $DHCert_{U1}$ has failed (step S530: NO), the process may be terminated. Operations S530 and S540 may be similar to operations S330 and S340 in FIG. 9, respectively.

Referring to FIGS. 1, 13 and 14, in operation S600, a ciphering key $CK_{U1U2}$ is derived based on the second private key $WDHSK_{U2}$ and the first public key $DHPK_{U1}$ when the second verification is successfully completed.

At S610, a second KPK $KPK_{U2}$ may be obtained based on a second password $PWD_{U2}$ corresponding to the second user ID $ID_{U2}$ and a random value Salt1. Operation S610 may be similar to operation S410 in FIG. 10, and an operation of using a KDF 820 in FIG. 14 may correspond to operation S610 in FIG. 13.

At S620, a second private key $DHSK_{U2}$ that is an unwrapped key may be obtained based on the second KPK $KPK_{U2}$. Operation S620 may be similar to operation S420 in FIG. 10, and a decrypting operation (DEC) 830 in FIG. 14 may correspond to operation S620 in FIG. 13.

At S630, the ciphering key $CK_{U1U2}$ may be obtained by performing a key agreement based on the second private key $DHSK_{U2}$ for the second user ID $ID_{U2}$ and the first public key $DHPK_{U1}$ for the first user ID $ID_{U1}$ obtained by the second verification. Operation S630 may be similar to operation S430 in FIG. 10, and a key agreement operation (KEY_AGR) 840 in FIG. 14 may correspond to operation S630 in FIG. 13.

In some example embodiments, the second verification and the operation of deriving the ciphering key $CK_{U1U2}$ based on the second private key $DHSK_{U2}$ and the first public key $DHPK_{U1}$ may be performed using the second user storage region USR2 that is accessed only by the second user ID $ID_{U2}$.

Based on the above-described process, the first user ID $ID_{U1}$ and the second user ID $ID_{U2}$ may obtain the same ciphering key $CK_{U1U2}$. The first user ID $ID_{U1}$ may derive the ciphering key $CK_{U1U2}$ based on the authenticated second public key $DHPK_{U2}$ for the second user ID $ID_{U2}$, and only the second user ID $ID_{U2}$ having the second private key $DHSK_{U2}$ may derive the same ciphering key $CK_{U1U2}$.

Figure 15:
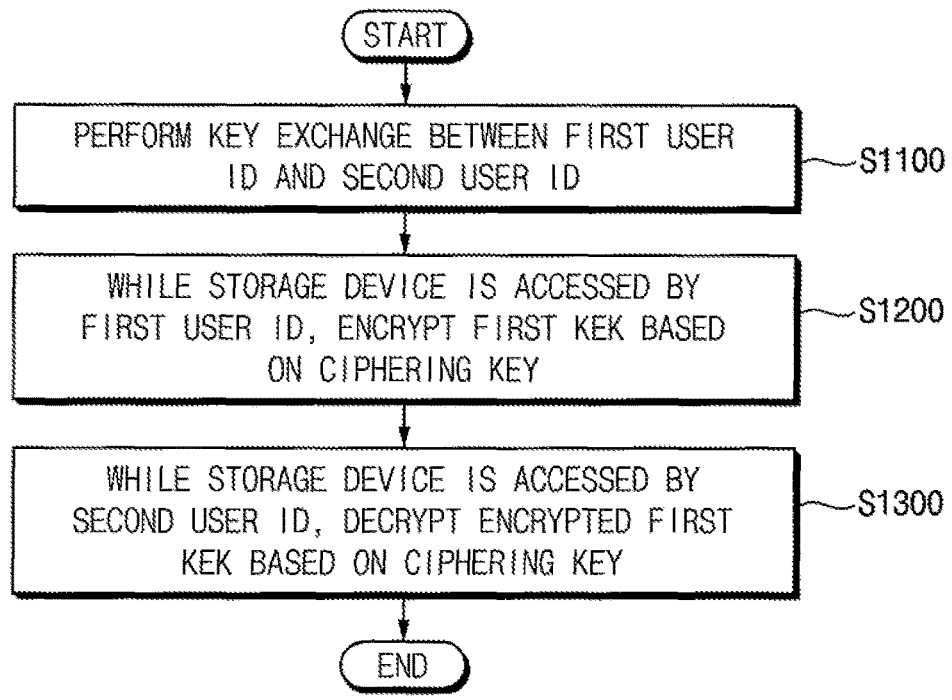
FIG. 15 illustrates an embodiment of a method of performing authority transfer.

FIG. 15 is a flowchart illustrating an embodiment of a method of performing authority transfer in a storage device. The method includes, at S1100, performing a key exchange between a first user ID and a second user ID. The first user ID corresponds to a first user that has a first access authority to a first storage region in the storage device. The second user ID corresponds to a second user to be obtained the first access authority.

Operation S1100 may be performed based on the method of performing key exchange according to example embodiments described with reference to FIGS. 1 through 14. The TTP may be used to securely and/or safely perform the key exchange. Each user and user ID may authenticate a public key based on a certificate signed by the TTP and may derive a ciphering key based on the authenticated public key. Thus, the key exchange with the unauthorized or invalid user may be prevented or blocked, and the key exchange may be performed with only the authorized or legitimate user. When the key exchange is successfully completed, the first user ID and the second user ID may obtain the same ciphering key.

At S1200, while the storage device is accessed by the first user ID, a first key-encryption-key (KEK) is encrypted based on the ciphering key. The first KEK corresponds to the first access authority, and the ciphering key is obtained by the key exchange. The first KEK may be a key to access the first storage region. The first user ID may already have the first access authority and the first KEK corresponding to the first access authority. Operation S1200 may be an operation for transferring the first KEK to the second user ID. An embodiment of operation S1200 is described with reference to FIGS. 16 and 17.

At S1300, while the storage device is accessed by the second user ID, the encrypted first KEK is decrypted based on the ciphering key. For example, the first KEK may be stored in a second key slot region allocated to the second user ID. When operation S1300 is performed, the second user ID may have the first KEK. An embodiment of operation S1300 is described with reference to FIGS. 18, 19 and 20.

As described above, both the first user ID and the second user ID may own or possess the first KEK, and thus both the first user ID and the second user ID may have the first access authority to the first storage region.

In the method of performing authority transfer in the storage device according to example embodiments, the key exchange may be performed with only the authorized or legitimate user based on the TTP, and the first user ID and the second user ID may obtain the same ciphering key when the key exchange is performed. The first KEK corresponding to the first access authority to the first storage region may be securely and/or safely transferred to the second user ID by based on the ciphering key. Accordingly, the storage device may have the improved or enhanced security performance.

Figure 16:
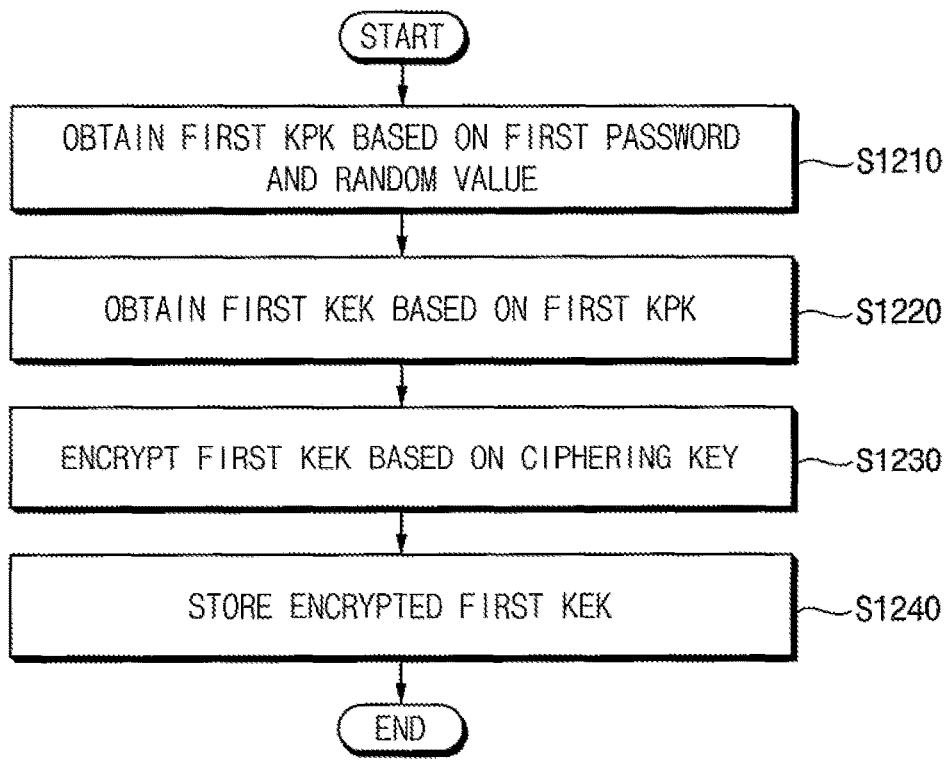
FIG. 16 illustrates an example of an operation of encrypting a first KEK.
Figure 17:
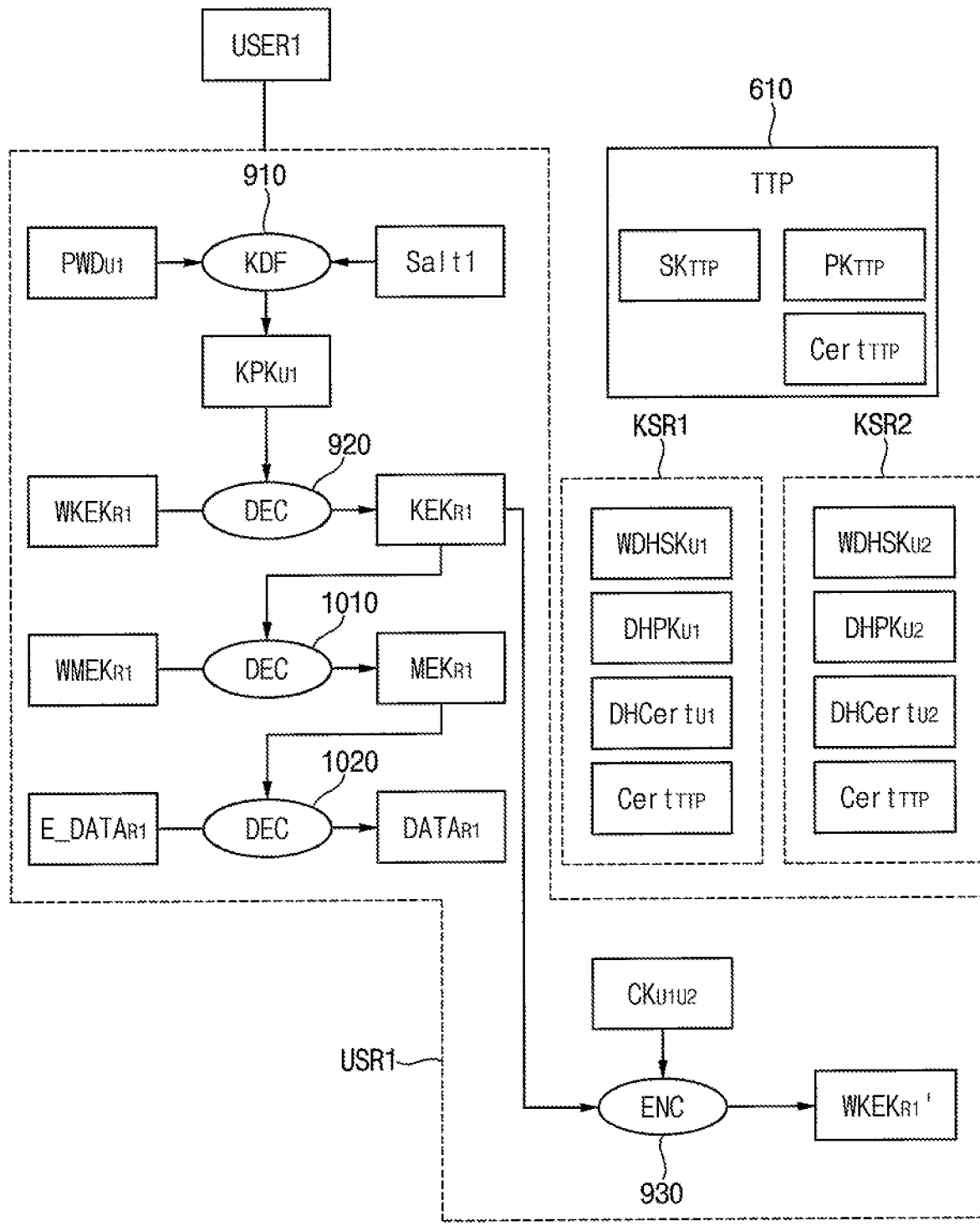
FIG. 17 illustrates an example to describe the operation of FIG. 16.

FIG. 16 is a flowchart illustrating an embodiment of an operation of encrypting a first KEK in FIG. 15, and FIG. 17 is a diagram illustrating an example for describing the operation of FIG. 16.

Referring to FIGS. 15 to 17, the method includes, at S1210, when encrypting a first KEK $KEK_{R1}$ while the storage device is accessed by the first user ID $ID_{U1}$ (S1200), a first KPK $KPK_{U1}$ may be obtained based on a first password $PWD_{U1}$ corresponding to the first user ID $ID_{U1}$ and a random value Salt1. Operation S1210 may be substantially the same as operation S410 in FIG. 10. An operation using a KDF 910 in FIG. 17 may correspond to operation S1210 in FIG. 16. In some example embodiments, when operation S410 is already performed, operation S1210 may be omitted.

At S1220, the first KEK $KEK_{R1}$ may be obtained based on the first KPK $KPK_{U1}$. For example, the first user ID $ID_{U1}$ may have the first KEK $KEK_{R1}$ by encrypting (or wrapping) the first KEK $KEK_{R1}$ based on the first KPK $KPK_{U1}$ and by storing the encrypted first KEK $WKEK_{R1}$ in the first key slot region KSR1. For example, the encrypted first KEK $WKEK_{R1}$ may be loaded, and the first KEK $KEK_{R1}$ may be generated by performing a decrypting operation (DEC) 920 on the encrypted first KEK $WKEK_{R1}$, as illustrated in FIG. 17. For example, the decrypting operation 920 may be performed based on an AES algorithm.

At S1230, the first KEK $KEK_{R1}$ may be encrypted based on the ciphering key $CK_{U1U2}$, and at S1240 the encrypted first KEK $WKEK_{R1}'$ may be stored. For example, the encrypted first KEK $WKEK_{R1}'$ may be generated by performing an encrypting operation (ENC) 930 on the first KEK $KEK_{R1}$, as illustrated in FIG. 17. For example, the encrypting operation 930 may be performed based on an AES algorithm. For example, the encrypted first KEK $WKEK_{R1}'$ may be stored in a region accessible by the second user ID $ID_{U2}$. For example, the encrypted first KEK $WKEK_{R1}'$ may be different from the encrypted first KEK $WKEK_{R1}$.

As illustrated in FIG. 17, the first user ID $ID_{U1}$ may access the first storage region. For example, when the first storage region is to be accessed by the first user ID $ID_{U1}$, the first KEK $KEK_{R1}$ may be obtained by performing the decrypting operation 920 based on the first KPK $KPK_{U1}$, an encrypted first media-encryption-key (MEK) $WMEK_{R1}$ and encrypted first data $E\_DATA_{R1}$ stored in the first storage region may be loaded, a first MEK $MEK_{R1}$ may be obtained by performing a decrypting operation (DEC) 1010 based on the first KEK $KEK_{R1}$, and first data $DATA_{R1}$ may be obtained by performing a decrypting operation (DEC) 1020 based on the first MEK $MEK_{R1}$. For example, the decrypting operations 1010 and 1020 may be performed based on an AES algorithm. In some example embodiments, operations S1210, S1220, S1230 and S1240 may be performed using the first user storage region USR1 that is accessed only by the first user ID $ID_{U1}$.

Figure 18:
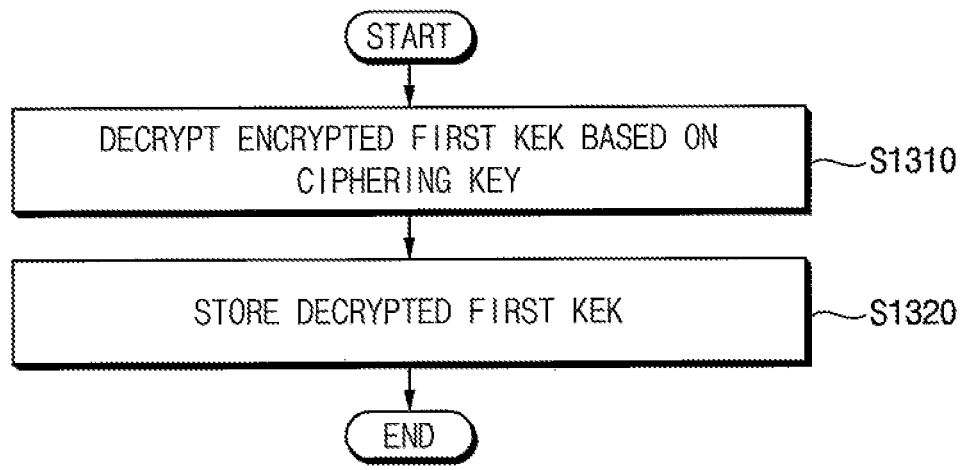
FIG. 18 illustrates an example of an operation of decrypting an encrypted first KEK.

FIG. 18 is a flowchart illustrating an embodiment of an operation of decrypting the encrypted first KEK in FIG. 15.

Figure 19:
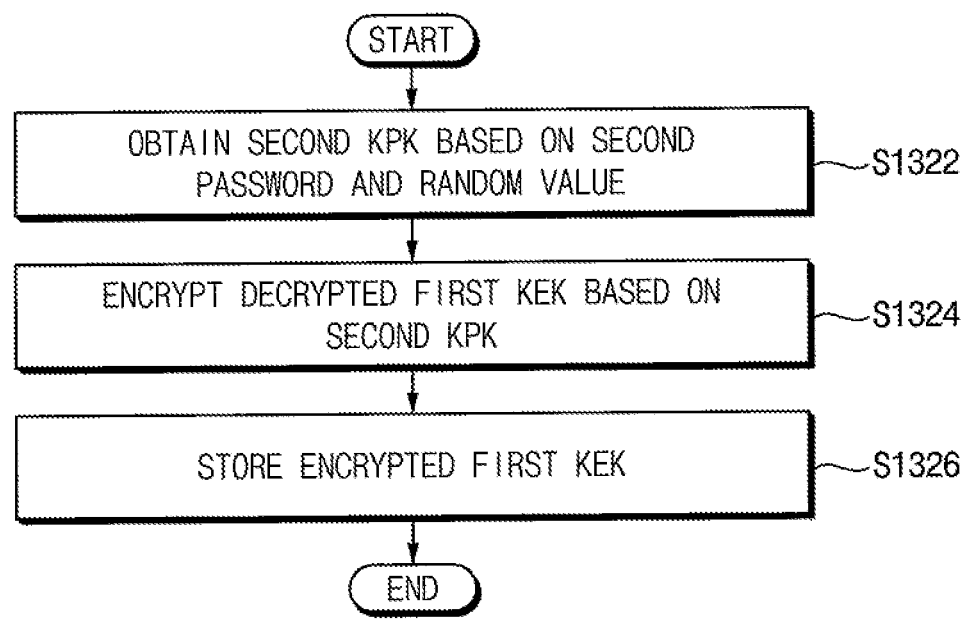
FIG. 19 illustrates an example of an operation of storing a decrypted first KEK.
Figure 20:
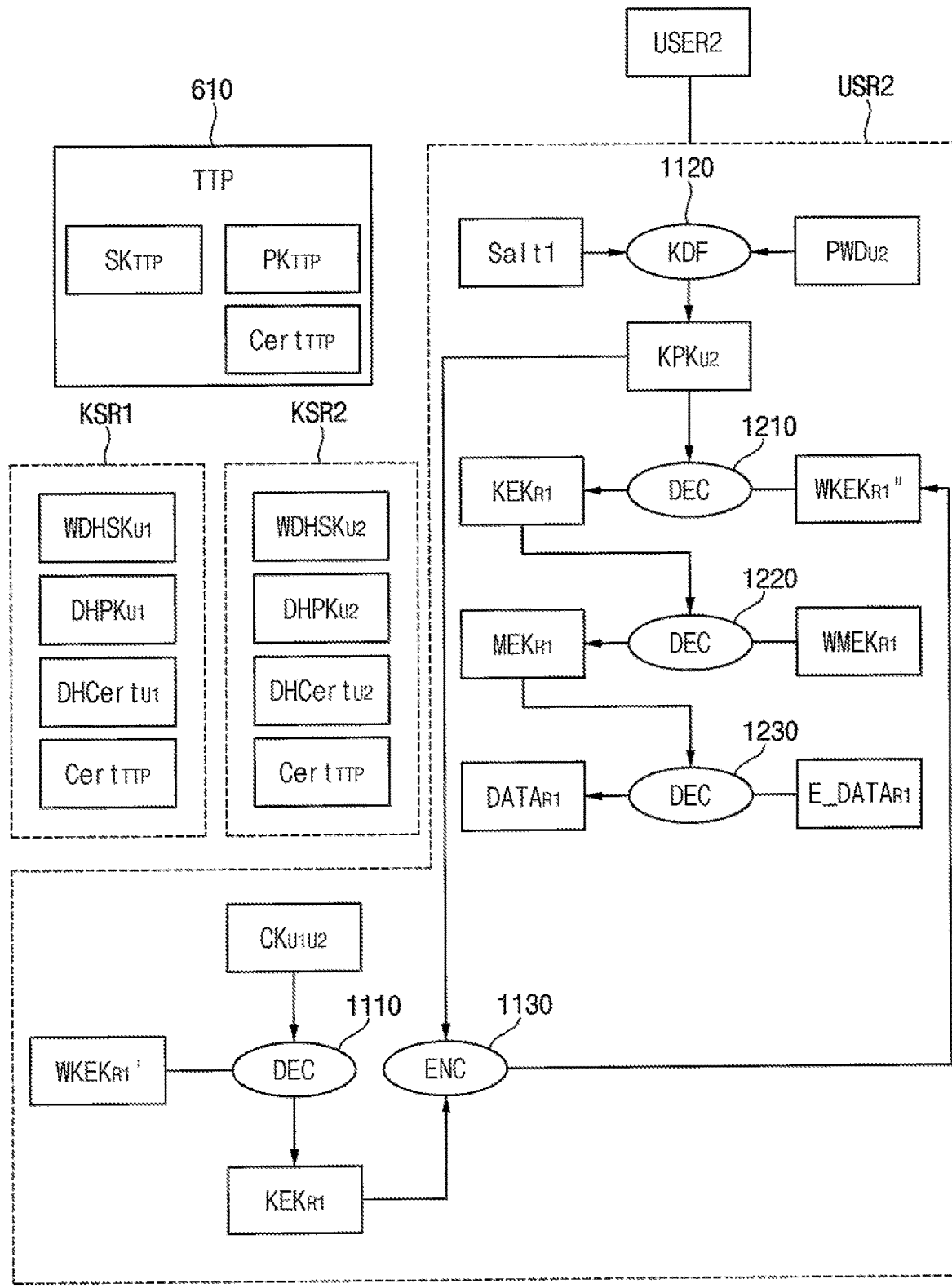
FIG. 20 illustrates an example to describe the operations of FIGS. 18 and 19.

FIG. 19 is a flowchart illustrating an embodiment of an operation of storing decrypted first KEK in FIG. 18. FIG. 20 is a diagram illustrating an example for describing the operations of FIGS. 18 and 19.

Referring to FIGS. 15 and 18 to 20, at S1310, when decrypting the encrypted first KEK $WKEK_{R1}'$ while the storage device is accessed by the second user ID $ID_{U2}$ (operation S1300), the encrypted first KEK $WKEK_{R1}'$ may be decrypted based on the ciphering key $CK_{U1U2}$. For example, a first KEK $KEK_{R1}$ may be generated by performing a decrypting operation (DEC) 1110 on the encrypted first KEK $WKEK_{R1}'$, as illustrated in FIG. 20. Since the first user ID $ID_{U1}$ and the second user ID $ID_{U2}$ have the same ciphering key $CK_{U1U2}$, the first KEK $KEK_{R1}$ obtained by the second user ID $ID_{U2}$ may be substantially equal to the first KEK $KEK_{R1}$ transferred by the first user ID $ID_{U1}$.

At S1320, the decrypted first KEK $KEK_{R1}$ may be stored. For example, at S1322, a second KPK $KPK_{U2}$ may be obtained based on a second password $PWD_{U2}$ corresponding to the second user ID $ID_{U2}$ and a random value Salt1. Operation S1322 may be substantially the same as operation S610 in FIG. 13. An operation using a KDF 1120 in FIG. 20 may correspond to operation S1322 in FIG. 19. In some example embodiments, when operation S610 is already performed, operation S1322 may be omitted.

At S1324, the decrypted first KEK $KEK_{R1}$ may be encrypted again based on the second KPK $KPK_{U2}$. For example, an encrypted first KEK $WKEK_{R1}''$ may be generated by performing an encrypting operation (ENC) 1130 on the decrypted first KEK $KEK_{R1}$, as illustrated in FIG. 20. For example, the encrypting operation 1130 may be performed based on an AES algorithm. For example, the encrypted first KEK $WKEK_{R1}''$ may be different from the encrypted first KEK $WKEK_{R1}'$ and the encrypted first KEK $WKEK_{R1}$.

At S1326, the encrypted first KEK may be stored. For example, the second user ID $ID_{U2}$ may own or possess the first KEK $KEK_{R1}$ by storing the encrypted first KEK $WKEK_{R1}''$ in the second key slot region KSR2.

As illustrated in FIG. 20, the second user ID $ID_{U2}$ may access the first storage region after the first KEK $KEK_{R1}$ is owned by the second user ID $ID_{U2}$. For example, when the first storage region is to be accessed by the second user ID $ID_{U2}$, the first KEK $KEK_{R1}$ may be obtained by performing a decrypting operation (DEC) 1210 based on the second KPK $KPK_{U2}$, an encrypted first MEK $WMEK_{R1}$ and encrypted first data $E\_DATA_{R1}$ stored in the first storage region may be loaded, a first MEK $MEK_{R1}$ may be obtained by performing a decrypting operation (DEC) 1220 based on the first KEK $KEK_{R1}$, and first data $DATA_{R1}$ may be obtained by performing a decrypting operation (DEC) 1230 based on the first MEK $MEK_{R1}$. For example, decrypting operations 1210, 1220 and 1230 may be performed based on an AES algorithm.

Figure 21:
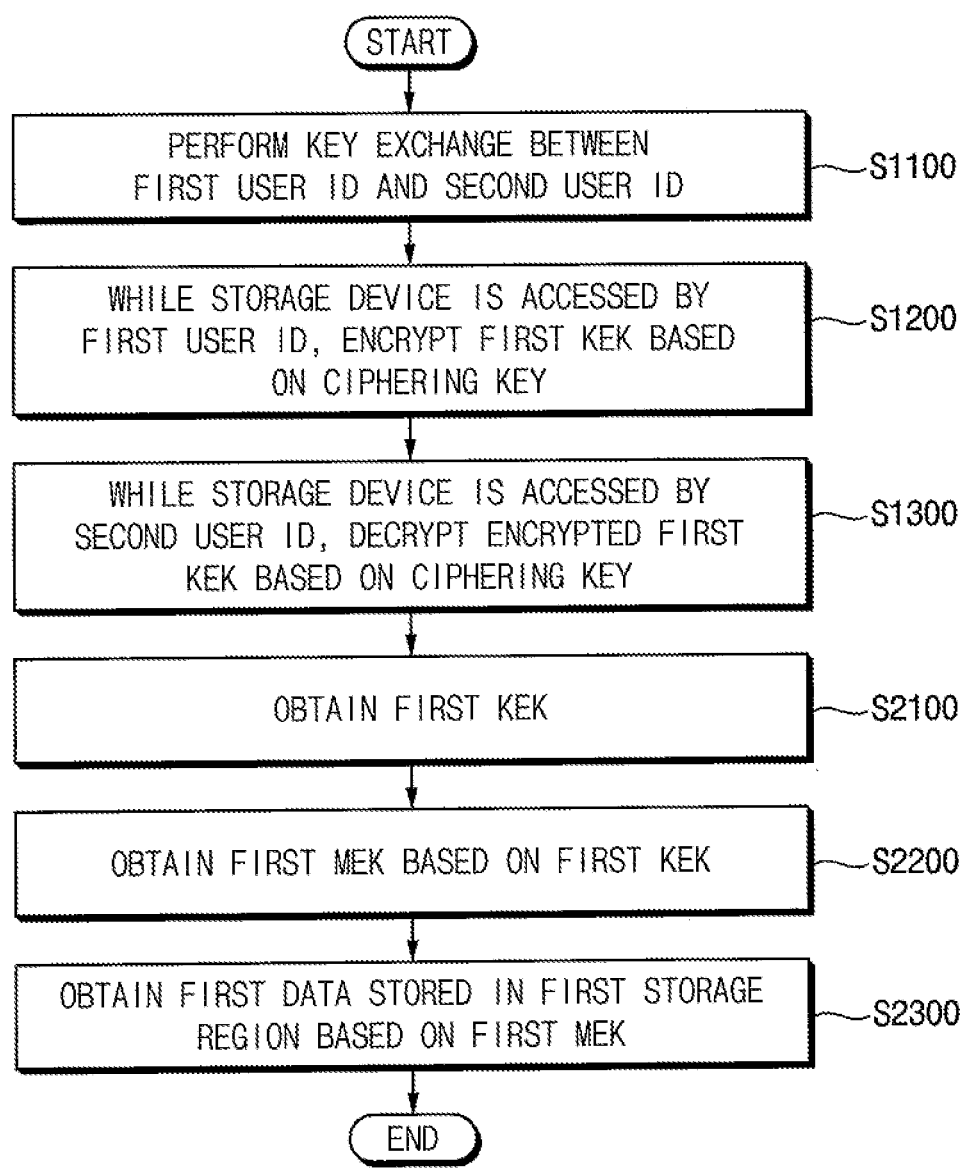
FIG. 21 illustrates an embodiment of a method of performing authority transfer.

FIG. 21 is a flowchart illustrating an embodiment of a method of performing authority transfer in a storage. Referring to FIG. 21, in this method operations S1100, S1200 and S1300 may be substantially the same as operations S1100 S1200, and S1300 in FIG. 15, respectively.

After both the first user ID and the second user ID have the first access authority, at least one of the first user ID or the second user ID may access the first storage region. For example, while the storage device is accessed by the first user ID, the first KEK may be obtained (step S2100), a first MEK may be obtained based on the first KEK (step S2200), and first data stored in the first storage region may be obtained based on the first MEK (step S2300). In this example, operations S2100, S2200 and S2300 may correspond to the decrypting operations 920, 1010 and 1020 in FIG. 17, respectively.

In one example, while the storage device is accessed by the second user ID, operations S2100, S2200 and S2300 may be performed. In this example, operations S2100, S2200 and S2300 may correspond to the decrypting operations 1210, 1220 and 1230 in FIG. 20, respectively.

In some example embodiments, the method of performing authority transfer of FIG. 21 may be described as a method of operating or driving the storage device.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 22:
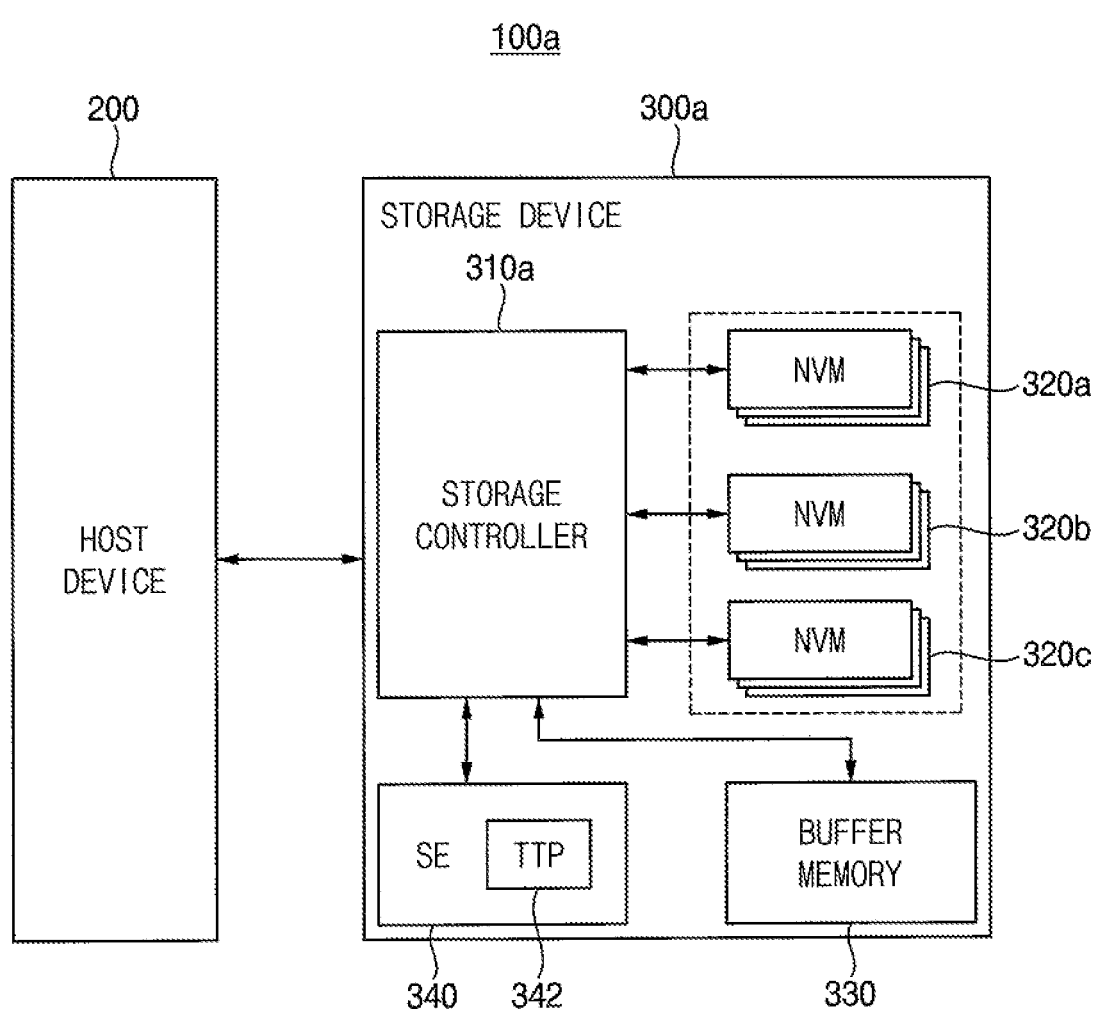
FIGS. 22 and 23 illustrate embodiments of a storage system.
Figure 23:
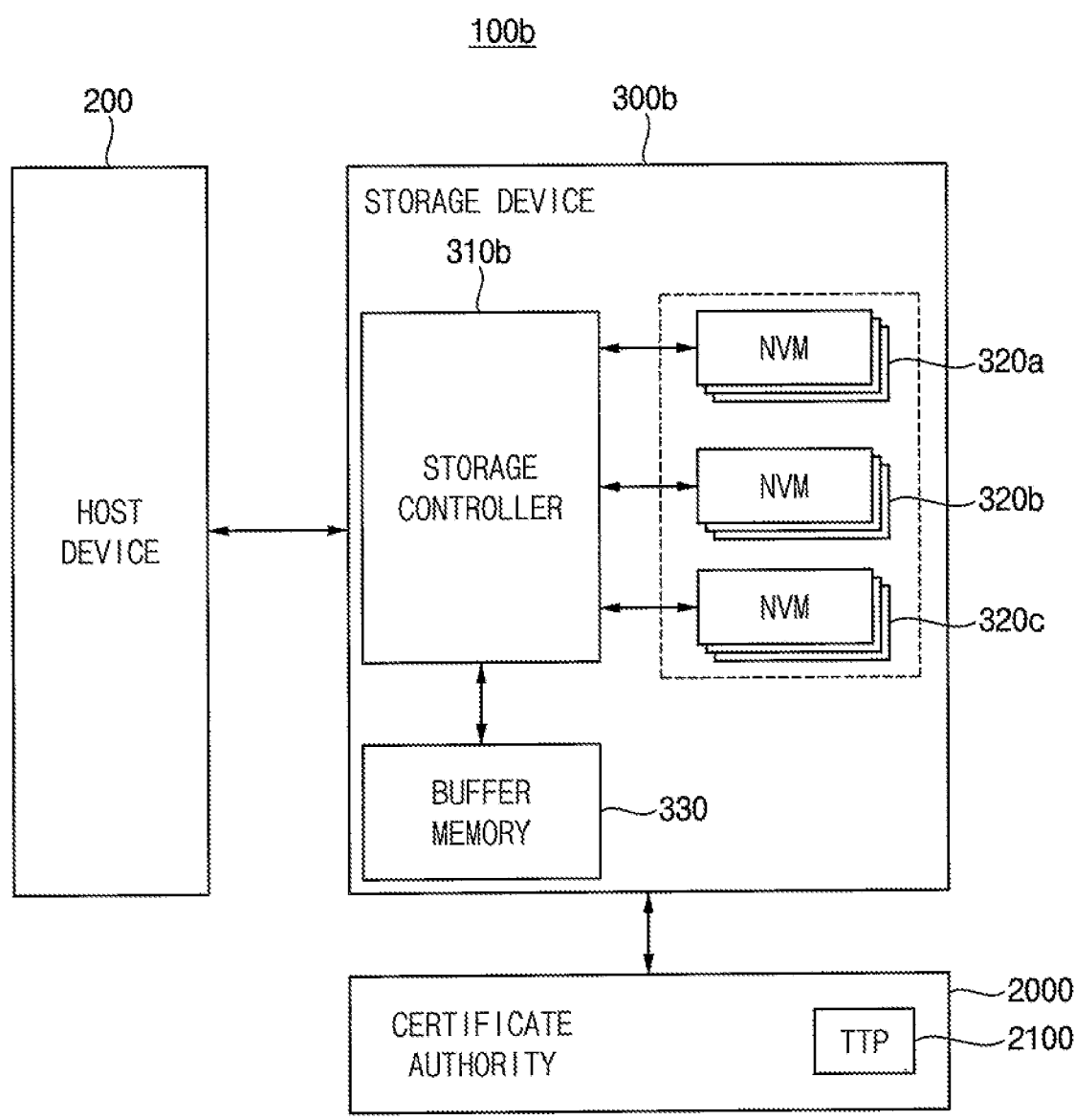

FIGS. 22 and 23 are block diagrams illustrating embodiments of storage systems including a storage device according to example embodiments.

Referring to FIG. 22, a storage system 100a includes a host device 200 and a storage device 300a. The storage device 300a includes a storage controller 310a, a plurality of nonvolatile memories 320a, 320b and 320c, and a buffer memory 330. The storage device 300a may further include a secure element (SE) 340. The storage system 100a may be substantially the same as the storage system 100 of FIG. 3, except that the TTP 342 is not in the storage controller 310a and is in the secure element 340. The secure element 340 may process and/or may store secure data such as a cryptographic key, sensitive data, a sensitive code, or the like. For example, the secure element 340 may be resistant against tampering attacks, such as micro-probing, a software attack, eavesdropping, a fault generation attack, etc. The secure element 340 may be referred to as a security hardware, a security component or a security module. Since the TTP 342 is in the secure element 340, the storage device 300a may have the improved or enhanced security performance.

Referring to FIG. 23, a storage system 100b includes a host device 200 and a storage device 300b. The storage system 100b may further include a certificate authority (CA) 2000. The storage system 100b may be substantially the same as the storage system 100 of FIG. 3, except that a TTP 2100 is not in the storage controller 310b and is in the certificate authority 2000 located outside the storage device 300b.

Although example embodiments are described with reference to FIGS. 1 through 22 that the certificate generating operation is performed inside the storage device, example embodiments are not limited thereto. For example, when the infrastructure is to be prepared during or after the manufacturing process, a certificate may be generated by a public key infrastructure (PKI) based on the external certificate authority 2000, and example embodiments may be performed based on the certificate generated by the external certificate authority 2000. In addition, example embodiments may be extended and applied using the X.509 standard certificate.

Figure 24:
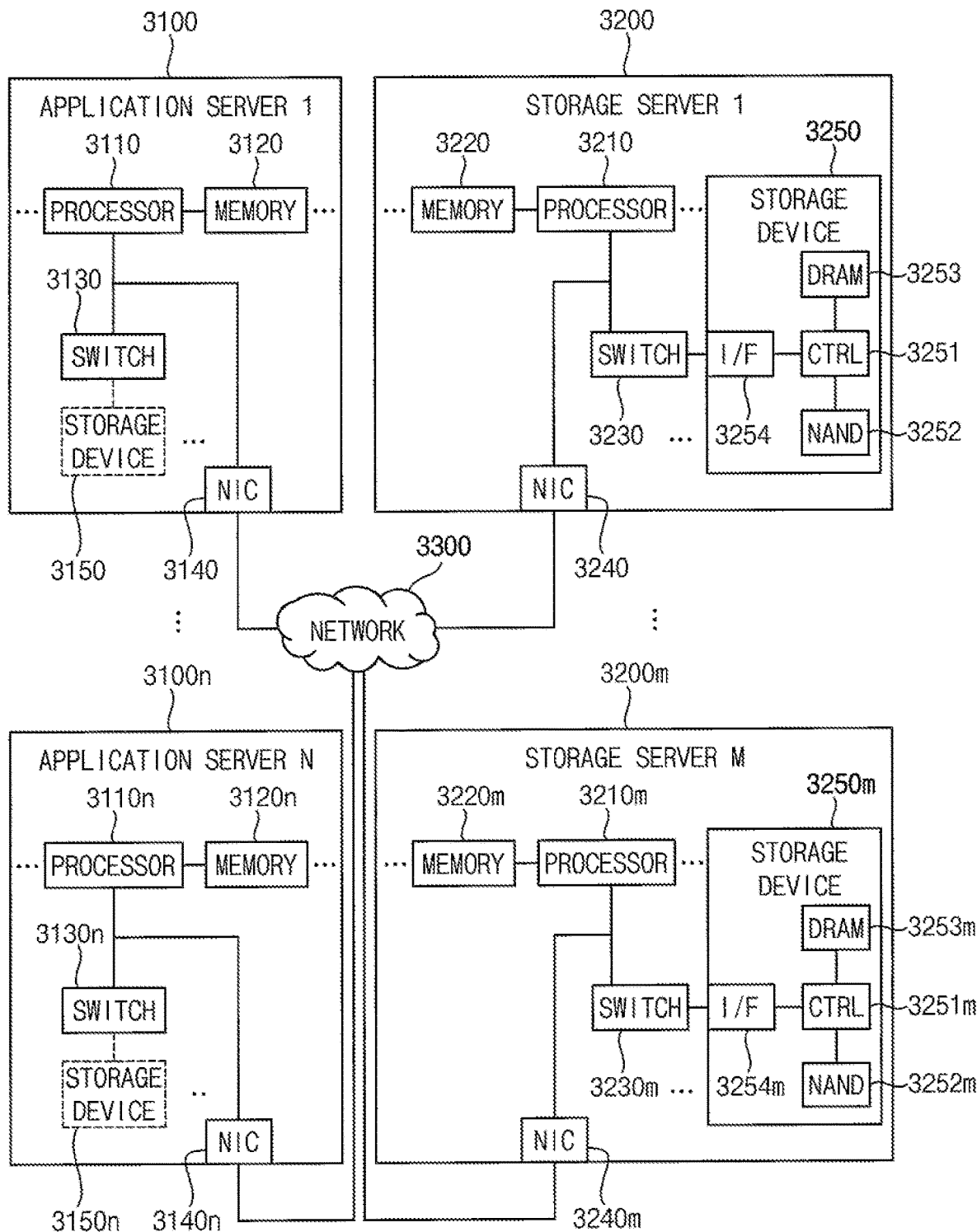
FIG. 24 illustrates a data center including a storage system according to an embodiment.

FIG. 24 is a block diagram illustrating an embodiment of a data center 3000 including a storage system according to any of the example embodiments described herein.

Referring to FIG. 24, the data center 3000 may be a facility that collects various types of data and provides various services and may be referred to as a data storage center. The data center 3000 may be a system for operating search engines and databases and may be a computing system used by companies such as banks or government agencies. The data center 3000 may include application servers 3100 to 3100n and storage servers 3200 to 3200m. The number of the application servers 3100 to 3100n and the number of the storage servers 3200 to 3200m may be variously selected according to example embodiments, and the number of the application servers 3100 to 3100n and the number of the storage servers 3200 to 3200m may be different from each other.

The application server 3100 may include at least one processor 3110 and at least one memory 3120, and the storage server 3200 may include at least one processor 3210 and at least one memory 3220. An operation of the storage server 3200 will be described as an example. The processor 3210 may control overall operation of the storage server 3200 and may access the memory 3220 to execute instructions and/or data loaded in the memory 3220. The memory 3220 may include at least one of a double data rate (DDR) synchronous dynamic random access memory (SDRAM), a high bandwidth memory (HBM), a hybrid memory cube (HMC), a dual in-line memory module (DIMM), an Optane DIMM, or a nonvolatile DIMM (NVDIMM). The number of the processors 3210 and the number of the memories 3220 in the storage server 3200 may be variously selected according to example embodiments. In some example embodiments, the processor 3210 and the memory 3220 may provide a processor-memory pair. In some example embodiments, the number of the processors 3210 and the number of the memories 3220 may be different from each other. The processor 3210 may include a single core processor or a multiple core processor. The above description of the storage server 3200 may be similarly applied to the application server 3100. The application server 3100 may include at least one storage device 3150, and the storage server 3200 may include at least one storage device 3250. In some example embodiments, the application server 3100 may not include the storage device 3150. The number of the storage devices 3250 in the storage server 3200 may be variously selected according to example embodiments.

The application servers 3100 to 3100n and the storage servers 3200 to 3200m may communicate with each other through a network 3300. The network 3300 may be implemented using a fiber channel (FC) or an Ethernet. The FC may be a medium used for a relatively high speed data transmission, and an optical switch that provides high performance and/or high availability may be used. The storage servers 3200 to 3200m may be provided as file storages, block storages or object storages according to an access scheme of the network 3300.

In some example embodiments, the network 3300 may be a storage-only network or a network dedicated to a storage such as a storage area network (SAN). For example, the SAN may be an FC-SAN that uses an FC network and is implemented according to an FC protocol (FCP). For another example, the SAN may be an IP-SAN that uses a transmission control protocol/internet protocol (TCP/IP) network and is implemented according to an iSCSI (a SCSI over TCP/IP or an Internet SCSI) protocol. In other example embodiments, the network 3300 may be a general or normal network such as the TCP/IP network. For example, the network 3300 may be implemented according to at least one of protocols such as an FC over Ethernet (FCoE), a network attached storage (NAS), a nonvolatile memory express (NVMe) over Fabrics (NVMe-oF), etc.

Hereinafter, example embodiments will be described based on the application server 3100 and the storage server 3200. The description of the application server 3100 may be applied to the other application server 3100n, and the description of the storage server 3200 may be applied to the other storage server 3200m.

The application server 3100 may store data requested to be stored by a user or a client into one of the storage servers 3200 to 3200m through the network 3300. In addition, the application server 3100 may obtain data requested to be read by the user or the client from one of the storage servers 3200 to 3200m through the network 3300. For example, the application server 3100 may be implemented as a web server or a database management system (DBMS).

The application server 3100 may access a memory 3120n or a storage device 3150n in the other application server 3100n through the network 3300, and/or may access the memories 3220 to 3220m or the storage devices 3250 to 3250m in the storage servers 3200 to 3200m through the network 3300. Thus, the application server 3100 may perform various operations on data stored in the application servers 3100 to 3100n and/or the storage servers 3200 to 3200m. For example, the application server 3100 may execute a command for moving or copying data between the application servers 3100 to 3100n and/or the storage servers 3200 to 3200m. The data may be transferred from the storage devices 3250 to 3250m of the storage servers 3200 to 3200m to the memories 3120 to 3120n of the application servers 3100 to 3100n directly or through the memories 3220 to 3220m of the storage servers 3200 to 3200m. For example, data transferred through network 3300 may be encrypted data for security or privacy.

In the storage server 3200, an interface 3254 may provide a physical connection between the processor 3210 and a controller 3251 and/or a physical connection between a network interface card (NIC) 3240 and the controller 3251. For example, the interface 3254 may be implemented based on a direct attached storage (DAS) scheme in which the storage device 3250 is directly connected with a dedicated cable. For example, the interface 3254 may be implemented based on at least one of various interface schemes. Examples include an advanced technology attachment (ATA), a serial ATA (SATA) an external SATA (e-SATA), a small computer system interface (SCSI), a serial attached SCSI (SAS), a peripheral component interconnection (PCI), a PCI express (PCIe), an NVMe, an IEEE 1394, a universal serial bus (USB), a secure digital (SD) card interface, a multi-media card (MMC) interface, an embedded MMC (eMMC) interface, a universal flash storage (UFS) interface, an embedded UFS (eUFS) interface, a compact flash (CF) card interface, etc.

The storage server 3200 may further include a switch 3230 and the NIC 3240. The switch 3230 may selectively connect the processor 3210 with the storage device 3250 or may selectively connect the NIC 3240 with the storage device 3250 under a control of the processor 3210. The application server 3100 may further include a switch 3130 and an NIC 3140.

In some example embodiments, the NIC 3240 may include a network interface card, a network adapter, or the like. The NIC 3240 may be connected to the network 3300 through a wired interface, a wireless interface, a Bluetooth interface, an optical interface, or the like. The NIC 3240 may further include an internal memory, a digital signal processor (DSP), a host bus interface, or the like, and may be connected to the processor 3210 and/or the switch 3230 through the host bus interface. The host bus interface may be implemented as one of the above-described examples of the interface 3254. In some example embodiments, the NIC 3240 may be integrated with at least one of the processor 3210, the switch 3230 or storage device 3250.

In the storage servers 3200 to 3200*m* and/or the application servers 3100 to 3100*n*, the processor may transmit a command to the storage devices 3150 to 3150*n* and 3250 to 3250*m* or the memories 3120 to 3120*n* and 3220 to 3220*m* to program or read data. For example, the data may be error-corrected data by an error correction code (ECC) engine. For example, the data may be processed by a data bus inversion (DBI) or a data masking (DM), and may include a cyclic redundancy code (CRC) information. For example, the data may be encrypted data for security or privacy.

The storage devices 3150 to 3150*m* and 3250 to 3250*m* may transmit a control signal and command/address signals to NAND flash memory devices 3252 to 3252*m* in response to a read command received from the processor. When data is read from the NAND flash memory devices 3252 to 3252*m*, a read enable (RE) signal may be input as a data output control signal and may serve to output data to a DQ bus. A data strobe signal (DQS) may be generated using the RE signal. The command and address signals may be latched in a page buffer based on a rising edge or a falling edge of a write enable (WE) signal.

The controller 3251 may control overall operations of the storage device 3250. In some example embodiments, the controller 3251 may include a static random access memory (SRAM). The controller 3251 may write data into the NAND flash memory device 3252 in response to a write command, or may read data from the NAND flash memory device 3252 in response to a read command. For example, the write command and/or the read command may be provided from the processor 3210 in the storage server 3200, the processor 3210*m* in the other storage server 3200*m*, or the processors 3110 to 3110*n* in the application servers 3100 to 3100*n*. A DRAM 3253 may temporarily store (e.g., may buffer) data to be written to the NAND flash memory device 3252 or data read from the NAND flash memory device 3252. Further, the DRAM 3253 may store meta data. The meta data may be data generated by the controller 3251 to manage user data or the NAND flash memory device 3252.

The storage devices 3150 to 3150*m* and 3250 to 3250*m* may be implemented based on the storage device and the method according to example embodiments described with reference to FIGS. 1 through 23. For example, the storage devices 3150 to 3150*m* and 3250 to 3250*m* may perform the method of performing key exchange and the method of performing authority transfer according to example embodiments.

The inventive concept may be applied to various electronic devices and systems that include the storage devices and the storage systems. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, modules, units, multiplexers, generators, logic, interfaces, decoders, drivers, generators and other signal generating and signal processing features of the embodiments disclosed herein may be implemented, for example, in non-transitory logic that may include hardware, software, or both. When implemented at least partially in hardware, the controllers, processors, devices, modules, units, multiplexers, generators, logic, interfaces, decoders, drivers, generators and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims. The embodiments may be combined to form additional embodiments.

What is claimed is:

1. A method of performing key exchange for a security operation in a storage device to be accessed by a plurality of user identifications (IDs), the method comprising:
    generating, by a trusted third party (TTP) in or coupled to the storage device, a first certificate based on a first user ID and a first public key;
    generating, by the TTP, a second certificate based on a second user ID and a second public key;
    while the storage device is accessed by the first user ID, performing a first verification on the second certificate based on a third certificate in or accessed by the TTP;
    when the first verification is successfully completed, deriving a ciphering key based on a first private key and the second public key obtained by the first verification;
    while the storage device is accessed by the second user ID, performing a second verification on the first certificate based on the third certificate; and
    when the second verification is successfully completed, deriving the ciphering key based on a second private key and the first public key obtained by the second verification.

2. The method of claim 1, wherein generating the first certificate includes:
    obtaining the first certificate by signing the first user ID and the first public key for the first user ID based on a third private key in or accessed by the TTP; and
    storing the first certificate in a first key slot region that is in a key slot and is allocated to the first user ID.

3. The method of claim 2, wherein the first certificate is stored with the first private key, the first public key and the third certificate in the first key slot region.

4. The method of claim 3, wherein the first private key is a wrapped key.

5. The method of claim 2, wherein generating the second certificate includes:
    obtaining the second certificate by signing the second user ID and the second public key for the second user ID based on the third private key; and
    storing the second certificate in a second key slot region that is in the key slot and is allocated to the second user ID.

6. The method of claim 5, wherein the second certificate is stored with the second private key, the second public key and the third certificate in the second key slot region.

7. The method of claim 2, wherein performing the first verification includes:
    extracting a third public key in the TTP based on the third certificate;
    verifying a signature for the second certificate based on the third public key; and
    when a verification on the signature for the second certificate is successfully completed, extracting the second user ID and the second public key in the second certificate.

8. The method of claim 7, wherein deriving the ciphering key based on the first private key and the second public key includes:
    obtaining a first key-protection-key (KPK) based on a first password corresponding to the first user ID and a random value;
    obtaining the first private key based on the first KPK; and
    obtaining the ciphering key by performing a key agreement based on the first private key and the second public key.

9. The method of claim 8, wherein the first verification and the operation of deriving the ciphering key based on the first private key and the second public key are performed using a first user storage region that is in the storage device and is accessed by the first user ID.

10. The method of claim 2, wherein performing the second verification includes:
    extracting a third public key in the TTP based on the third certificate;
    verifying a signature for the first certificate based on the third public key; and
    when a verification on the signature for the first certificate is successfully completed, extracting the first user ID and the first public key in the first certificate.

11. The method of claim 10, wherein deriving the ciphering key based on the second private key and the first public key includes:
    obtaining a second KPK based on a second password corresponding to the second user ID and a random value;
    obtaining the second private key based on the second KPK; and
    obtaining the ciphering key by performing a key agreement based on the second private key and the first public key.

12. The method of claim 11, wherein the second verification and the operation of deriving the ciphering key based on the second private key and the first public key are performed using a second user storage region that is in the storage device and is accessed only by the second user ID.

13. The method of claim 1, wherein the ciphering key derived based on the first private key and the second public key is substantially equal to the ciphering key derived based on the second private key and the first public key.

14. The method of claim 1, wherein:
    the storage device includes a storage controller configured to control an operation of the storage device,
    the storage controller includes a first processor configured to control a normal operation of the storage device, and a second processor that controls the security operation of the storage device, and
    the TTP is in or coupled to the second processor.

15. A method of performing authority transfer in a storage device that includes a first storage region and is accessed by a plurality of user identifications (IDs), the method comprising:
    performing a key exchange between a first user ID having a first access authority to the first storage region and a second user ID to be obtained the first access authority;
    while the storage device is accessed by the first user ID, encrypting a first key-encryption-key (KEK) based on a ciphering key, the first KEK corresponding to the first access authority, the ciphering key being obtained by the key exchange; and while the storage device is accessed by the second user ID, decrypting the encrypted first KEK based on the ciphering key, wherein performing the key exchange includes:

generating, by a trusted third party (TTP) in or coupled to the storage device, a first certificate for the first user ID based on the first user ID and a first public key;

generating, by the TTP, a second certificate for the second user ID based on the second user ID and a second public key;

while the storage device is accessed by the first user ID, performing a first verification on the second certificate based on a third certificate in or accessed by the TTP;

when the first verification is successfully completed, deriving the ciphering key based on a first private key and the second public key obtained by the first verification;

while the storage device is accessed by the second user ID, performing a second verification on the first certificate based on the third certificate; and when the second verification is successfully completed, deriving the ciphering key based on a second private key and the first public key obtained by the second verification.

16. The method of claim 15, wherein encrypting the first KEK includes:
obtaining a first key-protection-key (KPK) based on a first password corresponding to the first user ID and a random value;
obtaining the first KEK based on the first KPK;
encrypting the first KEK based on the ciphering key; and
storing the encrypted first KEK.

17. The method of claim 15, wherein decrypting the encrypted first KEK includes:
decrypting the encrypted first KEK based on the ciphering key; and
storing the decrypted first KEK.

18. The method of claim 17, wherein storing the decrypted first KEK includes:
obtaining a second KPK based on a second password corresponding to the second user ID and a random value;
encrypting the decrypted first KEK based on the second KPK; and
storing the encrypted first KEK.

19. The method of claim 18, further comprising:
obtaining the first KEK based on the second KPK;
obtaining a first media-encryption-key (MEK) based on the first KEK; and
obtaining first data stored in the first storage region based on the first MEK.

20. A method of performing key exchange for security operation in a storage device that is accessed by a first user identification (ID) and a second user ID, the first user ID having a first private key and a first public key, the second user ID having a second private key and a second public key, the key exchange being performed between the first user ID and the second user ID, the method comprising:

generating, by a trusted third party (TTP) in or coupled to the storage device and having a third private key and a third public key, a first certificate by signing the first user ID and the first public key based on the third private key;

generating, by the TTP, a second certificate by signing the second user ID and the second public key based on the third private key;

storing the first certificate, the second certificate and a third certificate for the TTP in a key slot in which the first private key, the first public key, the second private key and the second public key are stored;

accessing the storage device based on the first user ID and a first password;

while the storage device is accessed by the first user ID, performing a first verification on the second certificate by extracting the third public key based on the third certificate, by verifying a signature for the second certificate based on the third public key, and by extracting the second user ID and the second public key in the second certificate when a verification on the signature for the second certificate is successfully completed;

deriving a ciphering key by obtaining a first key-protection-key (KPK) based on the first password and a random value, by obtaining the first private key based on the first KPK, and by performing a key agreement based on the first private key and the second public key;

accessing the storage device based on the second user ID and a second password;

while the storage device is accessed by the second user ID, performing a second verification on the first certificate by extracting the third public key based on the third certificate, by verifying a signature for the first certificate based on the third public key, and by extracting the first user ID and the first public key in the first certificate when a verification on the signature for the first certificate is successfully completed; and deriving the ciphering key by obtaining a second KPK based on the second password and the random value, by obtaining the second private key based on the second KPK, and by performing the key agreement based on the second private key and the first public key.

* * * * *